US012567166B2

(12) United States Patent
Kim et al.

(10) Patent No.: US 12,567,166 B2
(45) Date of Patent: Mar. 3, 2026

(54) DEVICE FOR PROCESSING IMAGE AND OPERATING METHOD THEREOF

(71) Applicant: SAMSUNG ELECTRONICS CO., LTD., Suwon-si (KR)

(72) Inventors: Dongchan Kim, Suwon-si (KR); Jinyoung Hwang, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 584 days.

(21) Appl. No.: 18/081,195

(22) Filed: Dec. 14, 2022

(65) Prior Publication Data

US 2023/0119685 A1 Apr. 20, 2023

Related U.S. Application Data

(63) Continuation of application No. PCT/KR2021/007329, filed on Jun. 11, 2021.

(30) Foreign Application Priority Data

Jun. 19, 2020 (KR) ........................ 10-2020-0074968

(51) Int. Cl.
*G06V 10/77* (2022.01)
*G06T 7/70* (2017.01)
(Continued)

(52) U.S. Cl.
CPC .................. *G06T 7/70* (2017.01); *G06T 9/00* (2013.01); *G06V 10/25* (2022.01); *G06V 10/44* (2022.01);
(Continued)

(58) Field of Classification Search
CPC ... G06T 7/70; G06T 9/00; G06T 2207/20081; G06T 2207/20084; G06T 7/73;
(Continued)

(56) References Cited

U.S. PATENT DOCUMENTS 8,532,394 B2 * 9/2013 Kameyama ............ H04N 19/59
382/248
8,542,731 B2 9/2013 Tourapis et al.
(Continued)

FOREIGN PATENT DOCUMENTS

JP 2010-62926 A 3/2010
KR 10-2011-0046824 A 5/2011
(Continued)

OTHER PUBLICATIONS

Heng, Wen, Tingting Jiang, and Wen Gao. "How to assess the quality of compressed surveillance videos using face recognition." IEEE Transactions on Circuits and Systems for Video Technology 29.8 (2018): 2229-2243. (Year: 2018).*
(Continued)

*Primary Examiner* — Stephen R Koziol
*Assistant Examiner* — Dylan J Sherrillo
(74) *Attorney, Agent, or Firm* — Sughrue Mion, PLLC

(57) ABSTRACT

A processing device and an operating method of the processing device are provided. An embodiment of the present disclosure provides the processing device that obtains a reconstructed image of the raw image by compressing a raw image at a preset compression ratio, encoding the compressed raw image, and decoding the encoded image, recognizes, in the raw image, a target object and a first region of interest (ROI) including the target object and extracts a first feature vector from the target object recognized in the raw image, recognizes, in the reconstructed image, the target object and a second ROI including the target object and extracts a second feature vector from the target object recognized in the reconstructed image, determines whether the target object is recognized in the reconstructed image, based on a degree of overlap between the first and second ROIs and a degree of similarity between the first and second
(Continued)

feature vectors, and adjusts the preset compression ratio according to whether the target object is recognized.

17 Claims, 10 Drawing Sheets

(51) Int. Cl.

| | |
|---|---|
| *G06T 9/00* | (2006.01) |
| *G06V 10/25* | (2022.01) |
| *G06V 10/44* | (2022.01) |
| *G06V 10/74* | (2022.01) |

(52) U.S. Cl.
CPC ........ *G06V 10/761* (2022.01); *G06V 2201/07* (2022.01)

(58) Field of Classification Search
CPC ...... G06V 10/25; G06V 10/44; G06V 10/761; G06V 2201/07; G06V 10/454; G06V 10/77; G06V 40/171; H04N 19/124; H04N 19/139; H04N 19/147; H04N 19/167; H04N 19/20
See application file for complete search history.

(56) References Cited

U.S. PATENT DOCUMENTS

| | | | |
|---|---|---|---|
| 10,205,953 B2 | 2/2019 | Price et al. | |
| 10,244,262 B2 | 3/2019 | Gao et al. | |
| 10,735,724 B2 | 8/2020 | Choi et al. | |
| 11,019,365 B2 * | 5/2021 | Lu ........................ | H04N 19/132 |
| 11,184,614 B2 | 11/2021 | Ryu et al. | |
| 11,330,258 B1 * | 5/2022 | Elkhazin ............. | H04N 19/146 |
| 12,047,613 B2 * | 7/2024 | Cui ...................... | H04N 19/436 |
| 2013/0195206 A1 | 8/2013 | McCarthy | |
| 2016/0100166 A1 | 4/2016 | Dragne et al. | |

FOREIGN PATENT DOCUMENTS

| | | | |
|---|---|---|---|
| KR | 10-1060528 B1 | 8/2011 | |
| KR | 10-2012-0111413 A | 10/2012 | |
| KR | 10-1523740 B1 | 5/2015 | |
| KR | 10-1572535 B1 | 11/2015 | |
| KR | 10-1653223 B1 | 9/2016 | |
| KR | 10-2017-0068499 A | 6/2017 | |
| KR | 10-2017-0117453 A | 10/2017 | |
| KR | 10-2018-0033874 A | 4/2018 | |

OTHER PUBLICATIONS

Aghdam, et al., "Exploring Factors for Improving Low Resolution Face Recognition", 2019, ArXiv:1907.10104v2 [cs.CV], 8 pages total.

Sullivan et al., "Overview of the High Efficiency Video Coding (HEVC) Standard", 2012, IEEE Trans. Circuits Syst. Video Technol., vol. 22, No. 12, doi: 10.1109/TCSVT.2012.2221191, 20 pages total.

Gitman, et al., "Semiautomatic visual-attention modeling and its application to video compression", 2014, IEEE International Conference on Image Processing (ICIP), doi: 10.1109/ICIP.2014.7025220, 6 pages total.

Jiang et al., "Quality-Oriented Perceptual HEVC Based on the Spatiotemporal Saliency Detection Model", 2019, Entropy, vol. 21, Issue 165, doi: 10.3390/e21020165, 12 pages total.

Wang et al., "A fast and HEVC-compatible perceptual video coding scheme using a transform-domain Multi-Channel JND model", 2018, Multimed Tools Appl., vol. 77, No. 10, doi: 10.1007/s11042-017-4914-4, 27 pages total.

Li et al., "Background-Foreground Information Based Bit Allocation Algorithm for Surveillance Video on High Efficiency Video Coding (HEVC)", 2016, IEEE Conference Publication, VCIP, https://ieeexplore.ieee.org/document/7805562, 4 pages total.

Deng et al., "RetinaFace: Single-stage Dense Face Localisation in the Wild", 2019, ArXiv:1905.00641v2 [cs.CV], 10 pages total.

Deng et al., "ArcFace: Additive Angular Margin Loss for Deep Face Recognition", 2015, Journal of Latex Class Files, vol. 14, Issue 8, ArXiv:1801.07698v4 [cs.CV], 17 pages total.

Kumar, et al., "Attribute and simile classifiers for face verification", 2009, IEEE 12th International Conference on Computer Vision, doi: 10.1109/ICCV.2009.5459250, 8 pages total.

Kemelmacher-Shlizerman, et al., "The MegaFace Benchmark: 1 Million Faces for Recognition at Scale", 2015, ArXiv:1512.00596v1 [cs.CV], 15 pages total.

Viitanen, et al., "Kvazaar: Open-Source HEVC/H.265 Encoder", 2016, Proceedings of the 24th ACM International Conference on Multimedia, doi: 10.1145/2964284.2973796, 5 pages total.

Najjar, et al., "Video Surveillance for Sensor Platforms", 2013, Algorithms and Architectures, DOI 10.1007/978-1-4614-1857-3, 15 pages total.

Chen et al., "Face Image Quality Assessment Based on Learning to Rank", 2015, IEEE Signal Processing Letters, vol. 22, Issue 1, doi: 10. 1109/LSP.2014.2347419, 6 pages total.

"Video compression picture types", 2022, Wikipedia, https://en.wikipedia.org/w/index.php?title=Video_compression_picture_types&oldid=1093522982, 4 pages total.

Denyer, et al., "China's watchful eye", 2018, Washington Post, 17 pages total.

Heng et al., "How to Assess the Quality of Compressed Surveillance Videos Using Face Recognition", 2018, IEEE Journals & Magazine, DOI: 10.1109/TCSVT.2018.2866701, 18 pages total.

Search Report (PCT/ISA/220, PCT/ISA/210) issued Sep. 27, 2021 by the International Searching Authority for International Patent Application No. PCT/KR2021/007329.

Written Opinion (PCT/ISA/237) issued Sep. 27, 2021 by the International Searching Authority for International Patent Application No. PCT/KR2021/007329.

* cited by examiner

FIG. 3

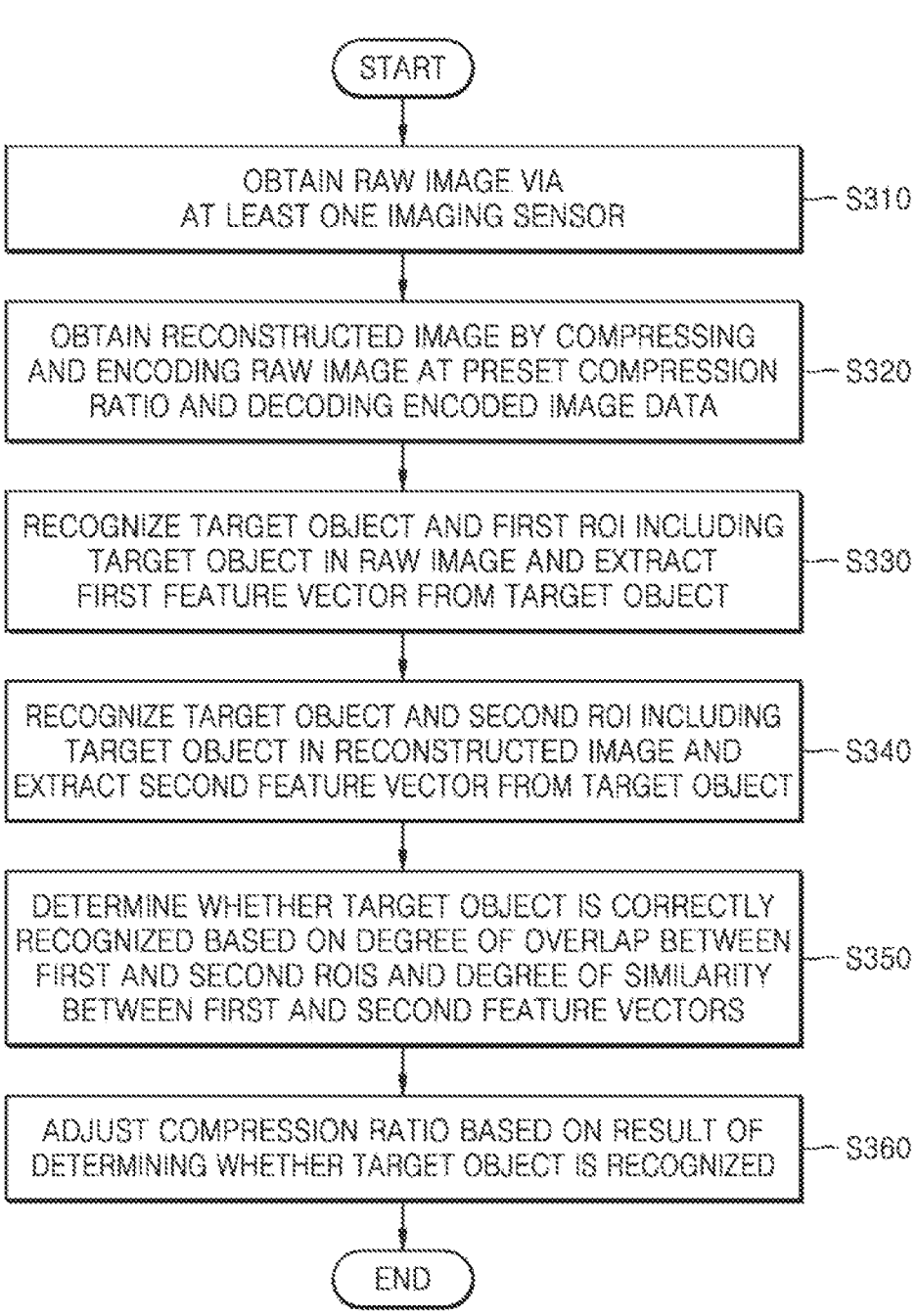

START

OBTAIN RAW IMAGE VIA
AT LEAST ONE IMAGING SENSOR — S310

OBTAIN RECONSTRUCTED IMAGE BY COMPRESSING
AND ENCODING RAW IMAGE AT PRESET COMPRESSION
RATIO AND DECODING ENCODED IMAGE DATA — S320

RECOGNIZE TARGET OBJECT AND FIRST ROI INCLUDING
TARGET OBJECT IN RAW IMAGE AND EXTRACT
FIRST FEATURE VECTOR FROM TARGET OBJECT — S330

RECOGNIZE TARGET OBJECT AND SECOND ROI INCLUDING
TARGET OBJECT IN RECONSTRUCTED IMAGE AND
EXTRACT SECOND FEATURE VECTOR FROM TARGET OBJECT — S340

DETERMINE WHETHER TARGET OBJECT IS CORRECTLY
RECOGNIZED BASED ON DEGREE OF OVERLAP BETWEEN
FIRST AND SECOND ROIS AND DEGREE OF SIMILARITY
BETWEEN FIRST AND SECOND FEATURE VECTORS — S350

ADJUST COMPRESSION RATIO BASED ON RESULT OF
DETERMINING WHETHER TARGET OBJECT IS RECOGNIZED — S360

END

DEVICE FOR PROCESSING IMAGE AND OPERATING METHOD THEREOF

CROSS-REFERENCE TO RELATED APPLICATIONS

This application is a by-pass continuation application of International Application No. PCT/KR2021/007329, filed on Jun. 11, 2021, which based on and claims priority to Korean Patent Application No. 10-2020-0074968, filed on Jun. 19, 2020, in the Korean Intellectual Property Office, the disclosures of which are incorporated by reference herein in their entireties.

BACKGROUND

1. Field

The present disclosure relates to a device for processing an image or a video and a method thereof. More particularly, the present disclosure relates to a device for performing image processing for recognizing a target object in the image or the video.

2. Description of Related Art

Recently, surveillance camera systems have been increasingly installed inside or outside buildings, on streets, etc., for various purposes, such as crime prevention, security, store management, etc. As an example of a surveillance camera system, IP camera systems are in widespread use. The IP camera systems are connected to each other through a wired or wireless network to transmit and receive image data.

In a surveillance camera system, it is desirable to accurately recognize a person's face from a video captured using a camera. In a general system using a device, due to constraints on storage capacity or network bandwidths, a video captured using a camera is compressed and encoded before transmission to an external server. In this case, when encoding is performed at an excessively high compression ratio, the quality of an image degrades so that a face, a hairstyle, clothing, etc. of a person to be recognized may not be identified in the image. Furthermore, in exceptional situations, such as limited network bandwidth, data packet loss due to network instability, an error in an encoding operation, data packet loss in a User Datagram Protocol (UDP) environment, etc., a decoded image frame degrades, and a person's face and the like cannot be recognized in the degraded image frame. When the person's face cannot be accurately recognized in the degraded image frame, the person is mistakenly recognized as another person, and thus, it is difficult to track an unauthorized person.

SUMMARY

The present disclosure relates to a method and a device for processing an image or a video captured using a camera, and more particularly, to a device and operating method thereof for determining a compression ratio capable of improving accuracy in recognition of a target object from the image or the video.

To solve the above technical problem, an embodiment of the present disclosure provides a method, performed by a device, of processing a video. According to an embodiment of the present disclosure, a method performed by a processing device, includes: obtaining a raw image from at least one imaging sensor; obtaining a reconstructed image of the raw image by compressing the raw image at a preset compression ratio, encoding the compressed raw image, and decoding the encoded image; recognizing, in the raw image, a target object and a first region of interest (ROI) including the target object, and extracting a first feature vector from the target object recognized in the raw image; recognizing, in the reconstructed image, the target object and a second ROI including the target object, and extracting a second feature vector from the target object recognized in the reconstructed image; determining whether the target object is recognized in the reconstructed image, based on a degree of overlap between the first ROI and the second ROI and a degree of similarity between the first feature vector and the second feature vector; and adjusting the preset compression ratio according to whether the target object is recognized.

According to an embodiment of the present disclosure, the determining of whether the target object is recognized comprises: calculating the degree of overlap between the first ROI and the second ROI; calculating the degree of similarity between the first feature vector and the second feature vector; comparing the calculated degree of overlap with a preset first threshold and comparing the calculated degree of similarity with a preset second threshold; and determining, based on results of the comparisons, whether the target object is recognized in the reconstructed image.

According to an embodiment of the present disclosure, the adjusting of the preset compression ratio based on the comparing between the calculated degree of overlap with the first threshold or the comparing between the calculated degree of similarity with the second threshold includes lowering a value of the preset compression ratio based on (i) the degree of overlap that is less than or equal to the first threshold or (ii) the degree of similarity that is less than or equal to the second threshold.

According to an embodiment of the present disclosure, the method further includes obtaining another reconstructed image of the raw image by compressing the raw image at an adjusted preset compression ratio, encoding the compressed raw image, and decoding the encoded image. The adjusted preset compression ratio has the value that is lowered based on (i) the degree of overlap that is less than or equal to the first threshold or (ii) the degree of similarity that is less than or equal to the second threshold.

According to an embodiment of the present disclosure, the adjusting of the preset compression ratio includes determining the preset compression ratio to obtain the reconstructed image as a final compression ratio based on the calculated degree of overlap exceeds the first threshold or the calculated degree of similarity exceeds the second threshold.

According to an embodiment of the present disclosure, the calculating of the degree of overlap includes: obtaining first position coordinate values of the first ROI that is a region where the target object is recognized from the raw image; obtaining second position coordinate values of the second ROI that is a region where the target object is recognized from the reconstructed image; and calculating the degree of overlap, which indicates a degree to which the first ROI and the second ROI overlap, by using the first position coordinate values and the second position coordinate values.

According to an embodiment of the present disclosure, the reconstructed image is obtained by compressing, encoding, and decoding the raw image by using at least one image compression standard, and the preset compression ratio is determined by a quantization parameter (QP) in the at least one image compression standard.

According to an embodiment of the present disclosure, a processing device includes: an imaging sensor configured to obtain a raw image by capturing an image of an object; an encoder including an imaging sensor configured to obtain a raw image by capturing an image of an object; an encoder including an encoding module configured to generate encoded image data by compressing the raw image at a preset compression ratio and encoding the compressed raw image into image data and a decoding module configured to generate a reconstructed image of the raw image by decoding the encoded image data; a network interface configured to receive the raw image and the reconstructed image; a memory storing a program including one or more instructions; and a processor configured to execute the one or more instructions of the program stored in the memory to: recognize, in the raw image, a target object and a first region of interest (ROI) including the target object, and extract a first feature vector from the target object recognized in the raw image, recognize, in the reconstructed image, the target object and a second ROI including the target object, and extract a second feature vector from the target object recognized in the reconstructed image, determine whether the target object is recognized in the reconstructed image, based on a degree of overlap between the first ROI and the second ROI and a degree of similarity between the first feature vector and the second feature vector, and adjust the preset compression ratio according to whether the target object is recognized.

According to an embodiment of the present disclosure, the processor is further configured to calculate the degree of overlap between the first ROI and the second ROI, calculate the degree of similarity between the first feature vector and the second feature vector, compare the calculated degree of overlap with a preset first threshold and compare the calculated degree of similarity with a preset second threshold, and determine, based on results of the comparisons, whether the target object is recognized in the reconstructed image.

According to an embodiment of the present disclosure, the processor is further configured to lower a value of the preset compression ratio based on (i) the degree of overlap that is less than or equal to the first threshold or (ii) the degree of similarity that is less than or equal to the second threshold.

According to an embodiment of the present disclosure, the processor is further configured to obtain another reconstructed image of the raw image by compressing the raw image at an adjusted preset compression ratio, encoding the compressed raw image, and decoding the encoded image. The adjusted preset compression ratio has the value that is lowered based on (i) the degree of overlap that is less than or equal to the first threshold or (ii) the degree of similarity that is less than or equal to the second threshold.

According to an embodiment of the present disclosure, the processor is further configured to determine to obtain the reconstructed image as a final compression ratio based on the calculated degree of overlap exceeds the first threshold or the calculated degree of similarity exceeds the second threshold.

According to an embodiment of the present disclosure, the processor is further configured to: obtain first position coordinate values of the first ROI that is a region where the target object is recognized from the raw image, obtain second position coordinate values of the second ROI that is a region where the target object is recognized from the reconstructed image, and calculate the degree of overlap, which indicates a degree to which the first ROI and the second ROI overlap, by using the first position coordinate values and the second position coordinate values.

According to an embodiment of the present disclosure, the reconstructed image is obtained by compressing, encoding, and decoding the raw image by using at least one image compression standard, and the preset compression ratio is determined by a quantization parameter (QP) in the at least one image compression standard.

According to an embodiment of the present disclosure, at least one image compression standard is at least one of H.264/advanced video coding (AVC) or high efficiency video coding (HEVC) (H.265).

According to an embodiment of the present disclosure, the at least one image compression standard is at least one of H.264/advanced video coding (AVC) or high efficiency video coding (HEVC) (H.265).

To solve the above technical problem, another embodiment of the present disclosure provides a computer-readable recording medium having recorded thereon a program executed by a computer. According to an embodiment of the present disclosure, a computer program product includes a computer-readable storage medium. The computer-readable storage medium includes instructions performed by a processing device, the instructions for: obtaining a raw image from at least one imaging sensor; obtaining a reconstructed image of the raw image by compressing the raw image at a preset compression ratio, encoding the compressed raw image, and decoding the encoded image; recognizing, in the raw image, a target object and a first region of interest (ROI) including the target object, and extracting a first feature vector from the target object recognized in the raw image; recognizing, in the reconstructed image, the target object and a second ROI including the target object, and extracting a second feature vector from the target object recognized in the reconstructed image; calculating a degree of overlap between the first ROI and the second ROI and calculating a degree of similarity between the first feature vector and the second feature vector; comparing the calculated degree of overlap with a first threshold and comparing the calculated degree of similarity with a second threshold; and adjusting the preset compression ratio according to whether the target object is recognized.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flowchart of a method, performed by a device, of processing an image, according to an embodiment of the present disclosure;

DETAILED DESCRIPTION

Figure 1A:
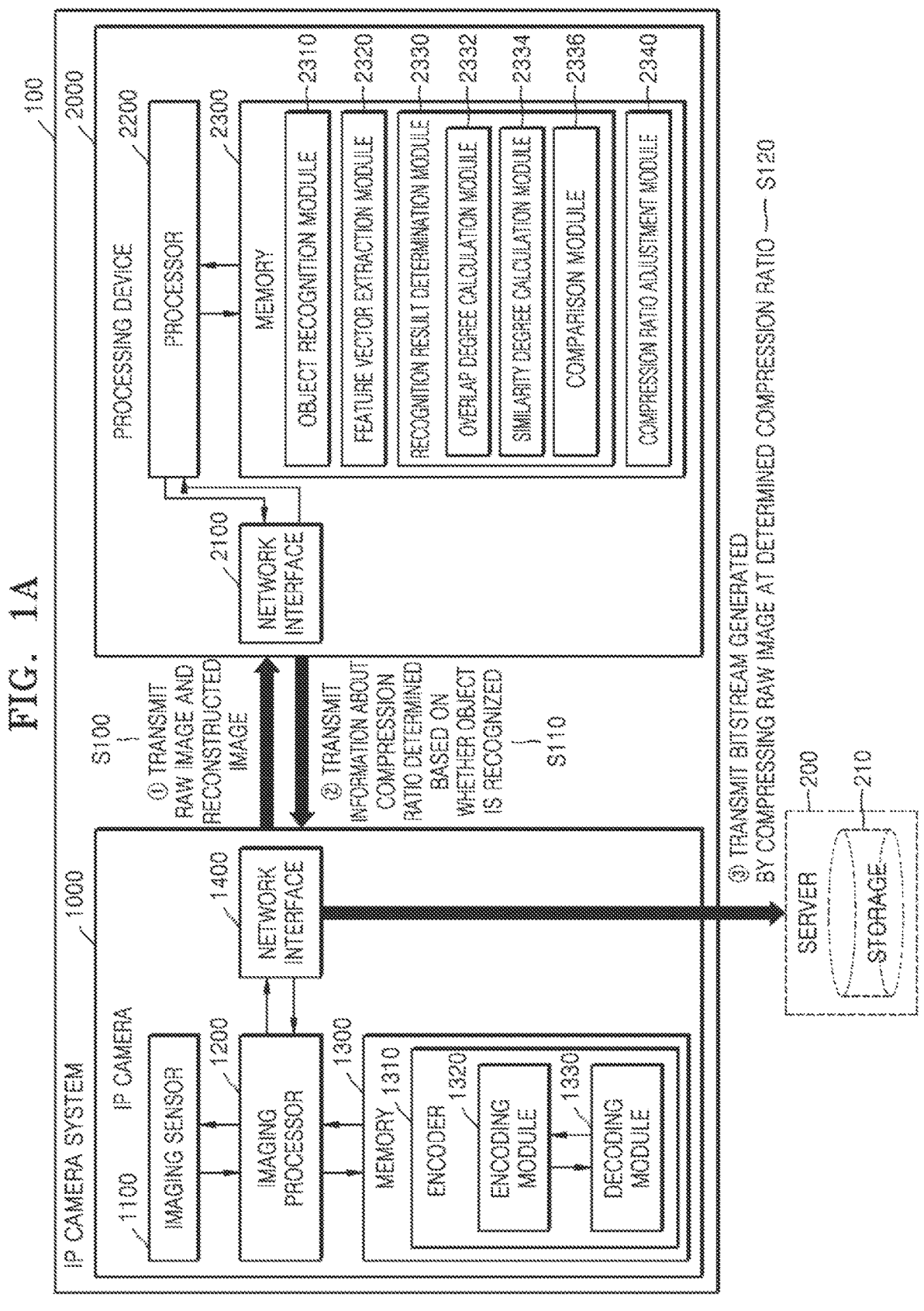
FIG. 1A is a block diagram illustrating a structure of an Internet Protocol (IP) camera system according to an embodiment of the present disclosure.

As the terms used herein, general terms that are currently widely used are selected by taking functions in the present disclosure into account, but the terms may have different meanings according to an intention of one of ordinary skill in the art, precedent cases, advent of new technologies, etc. Furthermore, specific terms may be arbitrarily selected by the applicant, and in this case, the meaning of the selected terms will be described in detail in the detailed description of a corresponding embodiment. Thus, the terms used herein should be defined not by simple appellations thereof but based on the meaning of the terms together with the overall description of the present disclosure.

Singular expressions used herein are intended to include plural expressions as well unless the context clearly indicates otherwise. All the terms used herein, which include technical or scientific terms, may have the same meaning that is generally understood by a person of ordinary skill in the art.

Throughout the present disclosure, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation and may be embodied as hardware or software or a combination of hardware and software.

The expression "configured to (or set to)" used herein may be used interchangeably, according to context, with the expression such as "suitable for," "having the capacity to," "designed to," "adapted to," "made to," or "capable of". The term "configured to (or set to)" may not necessarily mean only "specifically designed to" in terms of hardware. Instead, the expression "a system configured to" may mean, in some contexts, the system being "capable of", together with other devices or components. For example, the expression "a processor configured to (or set to) perform A, B, and C" may mean a dedicated processor (e.g., an embedded processor) for performing the corresponding operations or a general-purpose processor (e.g., a central processing unit (CPU) or an application processor (AP)) capable of performing the corresponding operations by executing one or more software programs stored in a memory.

In the present disclosure, a 'device' is an electronic device including at least one of an IP camera system and a mobile device.

In the present disclosure, an 'image' refers to a moving image or a video including at least one frame.

In the present disclosure, a 'raw image' is uncompressed image data obtained as an image captured using a camera is not compressed.

In the present disclosure, a 'compression ratio' represents an image compression parameter for compressing a raw image by using a method that matches a standard specification. Compression ratios may exist in various forms for each standard specification. For example, in standards for playing a video (e.g., H.264/advanced video coding (AVC), high efficiency video coding (HEVC) (H.265), etc.), a compression ratio of an image may be determined based on a quantization parameter.

In the present disclosure, a 'quantization parameter' is a parameter indicating a degree of quantization of transform coefficients defined in a standard related to compression of a video, e.g., H.264/AVC or HEVC (H.265), and may be used to determine a compression ratio of an image. In an embodiment, a compression ratio is proportional to a value of a quantization parameter. For example, when the value of the quantization parameter is large, the compression ratio is high, and when the value of the quantization parameter is small, the compression ratio is low.

In the present disclosure, a 'transform coefficient' refers to a coefficient obtained by transforming residual data into a transform domain using various transform techniques, the residual data representing a difference value between a raw image and a predicted image frame (I-frame) generated via intra-prediction using a spatial correlation among a plurality of image frames or inter-prediction using a temporal correlation. As a method of transforming residual data into transform coefficients in H.264/AVC, a discrete cosine transform (DCT), a Hadamard transform, etc. may be used.

FIG. 1A is a block diagram illustrating a structure of an Internet Protocol (IP) camera system 100 according to an embodiment of the present disclosure.

In an embodiment, the IP camera system 100 is a surveillance camera system and may capture in real-time an image of a target area or a target object being monitored for the purpose of surveillance or security.

Referring to FIG. 1A, the IP camera system 100 may include an IP camera 1000 and a processing device 2000.

The IP camera 1000 may obtain a raw image by capturing an image of the target region or the target object being monitored and obtain a reconstructed image by compressing the raw image with a preset compression ratio, encoding the raw image into image data, and decoding the encoded image data. The IP camera 1000 may be implemented as a pan-tilt-zoom (PTZ) camera or a fisheye camera, but is not limited thereto. Although only one IP camera 1000 is shown in FIG. 1A, the present disclosure is not limited thereto. In an embodiment, the IP camera system 100 may include a plurality of IP cameras 1000.

The IP camera 1000 transmits the raw image and the reconstructed image to the processing device 2000 (operation S100).

The IP camera 1000 may include an imaging sensor 1100, an imaging processor 1200, a memory 1300, and a network interface 1400.

The imaging sensor 1100 may obtain an image of a monitoring target area or target object captured through a lens. The image obtained via the imaging sensor 1100 is a raw image corresponding to uncompressed image data. The imaging sensor 1100 may include a photodiode array. The imaging sensor 1100 may include, for example, a charge-coupled device (CCD) module or a complementary metal-oxide-semiconductor (CMOS) module, but is not limited thereto.

Although one imaging sensor 1100 is shown in FIG. 1A, the present disclosure is not limited thereto. In an embodiment, the imaging sensor 1100 may be configured as a plurality of imaging sensors.

The imaging processor 1200 may generate a reconstructed image by performing image processing on the raw image obtained by the imaging sensor 1100. The imaging processor 1200 may compress the raw image at a preset compression ratio, encode the compressed raw image into image data, and decode the encoded image data by using an encoder 1310 stored in the memory 1300, thereby generating a reconstructed image.

The imaging processor 1200 may include a hardware component having computational capabilities to perform known image processing tasks. For example, the imaging processor 1200 may include at least one of a CPU, a microprocessor, or a graphics processing unit (GPU). However, the imaging processor 1200 is not limited to the examples listed above.

The memory 1300 may include the encoder 1310. The encoder 1310 is configured to generate a reconstructed image by compressing, encoding, and decoding a raw image using at least one of image compression standards, for example, H.264/AVC and HEVC (H.265).

The encoder 1310 may include an encoding module 1320 and a decoding module 1330. The encoding module 1320 may be configured to encode an input image, i.e., a raw image, using a preset compression ratio and obtain encoded image data from the raw image. In an embodiment, by using the encoding module 1320, the imaging processor 1200 may obtain prediction data from an input image, i.e., a raw image, via inter-prediction and intra-prediction, obtain residual data produced by subtracting the prediction data from the raw image, and obtain encoded image data by performing transformation and quantization on the residual data. For example, the encoded image data may be quantized transform coefficients.

The decoding module 1330 may be configured to generate a reconstructed image by decoding the encoded image data. In an embodiment, by using the decoding module 1330, the imaging processor 1200 may reconstruct the residual data by performing inverse quantization and inverse transform on the encoded image data, i.e., the quantized transform coefficients, and obtain a reconstructed image by adding the prediction data obtained via inter-prediction and intra-prediction to the reconstructed residual data.

When using an image compression standard, such as H.264/ACV or HEVC (H.265), the encoder 1310 may include, for example, an inter-prediction module, an intra-prediction module, a deblocking module, a transform module, a quantization module, an inverse transform module, an inverse quantization module, and an entropy encoding module. In this case, the modules listed above perform inter-prediction and intra-prediction and encoding and decoding, and thus, are not completely divided into the encoding module 1320 and the decoding module 1330, as shown in FIG. 1A. The encoding module 1320 and the decoding module 1330 are an example for explaining transformation and flow of data shown in FIG. 2.

When a reconstructed image is generated, for example, using H.264/AVC or HEVC (H.265), the reconstructed image may be obtained by compressing and encoding a raw image by applying different quantization parameter values according to a coding unit (CU) or a largest coding unit (LCU) and decoding encoded image data. In this case, a specific CU or LCU in which a target object (e.g., a person's face, hairstyle, clothing, posture, etc.) is detected among a plurality of CUs or LCUs in an image frame included in the raw image may be compressed by applying a lower quantization parameter value thereto than to other CUs or LCUs.

The network interface 1400 may perform data transmission and reception between the IP camera 1000 and the processing device 2000. The network interface 1400 may perform data communication with the processing device 2000 by using at least one of wired and wireless communication methods including Ethernet, wired and wireless local area networks (LANs), Wi-Fi, Wi-Fi Direct (WFD), and Wireless Gigabit Alliance (WiGig). The IP camera 1000 may transmit obtained image data of the raw image and image data of the reconstructed image to the processing device 2000 via the network interface 1400 (operation S100).

The processing device 2000 is a computing device configured to obtain the raw image and the reconstructed image from the IP camera 1000, determine whether a target object is accurately recognized in the raw image and the reconstructed image and determine a compression ratio for obtaining the reconstructed image based on a determining result. The processing device 2000 may be located in commercial facilities, such as stores and restaurants, or a home in which the IP camera system 100 is installed. The processing device 2000 may be, for example, a Personal Computer (PC), but is not limited thereto.

The processing device 2000 may include a network interface 2100, a processor 2200, and a memory 2300.

The network interface 2100 may perform data transmission and reception between the processing device 2000 and the IP camera 1000. The network interface 2100 may perform data communication with the IP camera 1000 by using at least one of the wired and wireless communication methods including Ethernet, wired and wireless LANs, Wi-Fi, WFD, and WiGig. In an embodiment, the network interface 2100 may receive the raw image and the reconstructed image from the IP camera 1000.

The processor 2200 may execute one or more instructions of a program stored in the memory 2300. The processor 2200 may be composed of hardware components for performing arithmetic, logic and input/output (I/O) operations and signal processing. For example, the processor 2200 may include at least one of a CPU, a microprocessor, a GPU, an AP, application specific integrated circuits (ASICs), digital signal processors (DSPs), digital signal processing devices (DSPDs), programmable logic devices (PLDs), and field programmable gate arrays (FPGAs), but is not limited thereto.

The memory 2300 may include, for example, at least one of a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EE-PROM), PROM, magnetic memory, magnetic disks, and optical disks.

The memory 2300 may store a program including instructions related to execution of a function or operation of determining a compression ratio for encoding the raw image based on regions in which target objects are detected respectively in the raw image and the reconstructed image and feature vectors extracted from the target objects. The memory 2300 may store at least one of instructions, algorithms, data structures, and program code that are readable by the processor 2200. The instructions, algorithms, data structures, and program code stored in the memory 2300 may be implemented by a programming or scripting language, such as C, C++, Java, assembler, etc.

In embodiments set forth below, the processor 2200 may be implemented by executing instructions or code of a program stored in the memory 2300.

The memory 2300 may include an object recognition module 2310, a feature vector extraction module 2320, a recognition result determination module 2330, and a compression ratio adjustment module 2340. A plurality of 'modules' included in the memory 2300 indicate a unit for processing a function or operation performed by the processor 2200, which may be implemented using software, such as instructions or program code.

The object recognition module 2310 is a module for recognizing a target object from a video. In an embodiment, the object recognition module 2310 may be configured to detect a target object in a video by using an artificial intelligence (AI) model including deep learning. In an embodiment, the object recognition module 2310 may detect a target object in a video by using a trained convolutional neural network (CNN) model. A target object refers to an object of interest that a user desires to detect in a video. The target object may include, for example, at least one of a person's face, hair, clothing, and posture.

The object recognition module 2310 may be configured to recognize the target object in the video by using model parameters trained via the CNN model. For example, when the target object is a face, the object recognition module 2310 may detect a person's face in a video by using a large scale dataset, such as CASIA-WebFace, VGGFaceNGG-Face 2, or MS-Celeb-1M. In an embodiment, the object recognition module 2310 may include a MobileNet trained to perform face recognition using the VGGFace2 dataset.

In an embodiment, the processor 2200 may detect a target object in each of the raw image and the encoded image by using data and program code in the object recognition module 2310. For example, the processor 2200 may obtain a person's face from each of the raw image and the reconstructed image by performing training using the model parameters trained via the CNN model included in the object recognition module 2310. However, the present disclosure is not limited thereto, and the processor 2200 may detect at least one of a person's hairstyle, clothing, and posture in each of the raw image and the reconstructed image by performing training based on the trained model parameters included in the object recognition module 2310.

However, a method, performed by the object recognition module 2310, of detecting a target object is not limited to the above-described method. In an embodiment, the object recognition module 2310 may be configured to recognize a target object in a video by using an AI model including at least one of a recurrent neural network (RNN) model, support vector machine (SVM), linear regression, logistic regression, Naive Bayes classification, random forest, decision tree, and a k-nearest neighbor algorithm.

In an embodiment, the object recognition module 2310 may be configured to identify a bounding box of a target object detected in a video and obtain position coordinate values of the identified bounding box. By using data and program code in the object recognition module 2310, the processor 2200 may identify a bounding box of a target object detected in the raw image and set a region included in the bounding box to be a first region of interest (ROI). By using the data and program code in the object recognition module 2310, the processor 2200 may identify a bounding box of a target object detected in the reconstructed image and set a region included in the bounding box to be a second ROI.

The feature vector extraction module 2320 is a module for extracting a feature vector from an image of a detected target object. The feature vector extraction module 2320 may be configured to extract a feature vector from an image of a target object by using a known image processing method or an AI model including deep learning. For example, the feature vector extraction module 2320 may be configured to extract a feature vector from an image of a target object by using an independent component analysis (ICA) or principle component analysis (PCA) method.

For example, when an image of a target object shows a person's face, the feature vector extraction module 2320 may identify landmarks including the eyes, the nose, and the mouth (both mouth corners) of the face, obtain feature values (e.g., position coordinate values) corresponding to the identified landmarks, and extract a feature vector by using the obtained feature values. In another example, when an image of a target object shows a person's hairstyle, clothing, or specific posture, the feature vector extraction module 2320 may identify at least one key-point in the image of the target object, obtain feature values (e.g., position coordinate values) corresponding to the identified key-point, and extract a feature vector by using the obtained feature values. An embodiment in which a feature vector related to a person's hairstyle, clothing, or posture is extracted using the feature vector extraction module 2320 is described in detail below with reference to FIG. 9.

In an embodiment, the feature vector extraction module 2320 may be configured to extract a feature vector from an image of a target object by using a CNN model. In an embodiment, the feature vector extraction module 2320 may extract feature values as a kernel having a preset size and a preset number of channels moves over an image of a target object with a stride. The feature vector extraction module 2320 may obtain a plurality of layers including the extracted feature values and obtain a feature vector map by applying weights to the plurality of layers. A rectified linear unit (ReLU) model may be used in the process of obtaining the feature vector value. In order to improve the efficiency of a CNN model, an operation of normalizing feature values through dropout and an operation of performing pooling or max pooling may be further added. The feature vector extraction module 2320 may be configured to extract a feature vector by using a CNN model, such as MobileNet v1/v2.

The processor 2200 may extract a feature vector from an image of a target object by using data and program code in the feature vector extraction module 2320. In an embodiment, the processor 2200 may extract a first feature vector from an image of a target object recognized in the raw image and extract a second feature vector from an image of a target object recognized in the reconstructed image.

The recognition result determination module 2330 is a module for determining whether the target object is correctly recognized in the reconstructed image, based on a degree of overlap between ROIs detected respectively in the raw image and the reconstructed image and a degree of similarity between feature vectors respectively extracted from the raw image and the reconstructed image. The recognition result determination module 2330 may include an overlap degree calculation module 2332, a similarity degree calculation module 2334, and a comparison module 2336.

The overlap degree calculation module 2332 is a module for calculating the degree of overlap among two or more images and outputting a resulting value. The overlap degree calculation module 2332 may obtain information about coordinate values of a bounding box on each of the two or more images. The overlap degree calculation module 2332 may be configured to calculate the degree of overlap by comparing the degree of overlap among two or more images using obtained coordinate values of corresponding bounding boxes.

In an embodiment, the overlap degree calculation module 2332 may calculate the degree of overlap among two or more images by using an Intersection Over Union (IoU) method for calculating the degree of overlap using coordinate value information. In the calculation of the degree of overlap using the IoU method, an IoU value of 1 means that two images perfectly or substantially overlap, and an IoU value of 0 means that the two images do not overlap at all. For example, when the IoU value is 0.5, it means that two-thirds of the two images overlap.

In an embodiment, the overlap degree calculation module 2332 may calculate the degree of overlap by calculating the sum of squares of errors between coordinate values of a plurality of images. For example, the overlap degree calculation module 2332 may calculate a coordinate value error by using coordinate values $(x_{11}, y_{11})$ of an upper-left corner of a first image, coordinate values $(x_{12}, y_{12})$ of a lower-right corner of the first image, coordinate values $(x_{21}, y_{21})$ of an upper-left corner of a second image, and coordinate values $(x_{22}, y_{22})$ of a lower-right corner of the second image, as shown in Equation 1 below.

$$\text{Coordinate Value Error} = (x_{11} - x_{12})^2 + (x_{12} - X_{22})^2 + (y_{11} - y_{21})^2 + (y_{12} - y_{22})^2 \qquad \text{[Equation 1]}$$

However, the IoU method and the coordinate value error calculation method are examples of an overlap degree calculation method, and a method, performed by the overlap degree calculation module 2332, of calculating the degree of overlap among two or more images is not limited to the IoU method and the coordinate value error calculation method.

By using data and program code in the overlap degree calculation module 2332, the processor 2200 may calculate a degree of overlap between the first ROI including the target object recognized in the raw image and the second ROI including the target object recognized in the reconstructed image, based on coordinate value information of a bounding box of the first ROI and coordinate value information of a bounding box of the second ROI. In an embodiment, the processor 2200 may calculate the degree of overlap between the first ROI and the second ROI by using the IoU method or the coordinate value error calculation method provided by the overlap degree calculation module 2332. In an embodiment, the processor 2200 may calculate a coordinate value error between the first and second ROIs by using coordinate values of an upper-left corner and a lower-right corner of a bounding box of the first ROI and coordinate values of an upper-left corner and a lower-right corner of a bounding box of the second ROI, and calculate the degree of overlap between the first and second ROIs based on the calculated coordinate value error.

The similarity degree calculation module 2334 is a module for calculating a degree of similarity between two feature vectors as a numerical value. In an embodiment, the similarity degree calculation module 2334 may be configured to calculate a correlation between two feature vectors as a numerical value.

The processor 2200 may calculate, as a numerical value, a degree of similarity between the first feature vector extracted from the target object detected in the raw image and the second feature vector extracted from the target object detected in the reconstructed image by using data and program code in the similarity degree calculation module 2334. The processor 2200 may calculate the degree of similarity between the first feature vector and the second feature vector, for example, by using Equation 2 below.

$$SIM = \frac{1}{N-1} \sum_{i=1}^{N} \left( \frac{F_{enc}[n] - \mu F_{enc}}{\sigma_{Fenc}} \right) \left( \frac{F_{orig}[n] - \mu F_{orig}}{\sigma_{Forig}} \right) \qquad \text{[Equation 2]}$$

In Equation 2 above, $F_{orig}$ and $F_{enc}$ respectively denote a first feature vector extracted from a target object detected in the raw image and a second feature vector extracted from a target object detected in the reconstructed image, and N is a length of the feature vectors, μ is a mean value of the feature vectors, and σ is a standard deviation of the feature vectors.

Equation 2 is an example for calculating the degree of similarity, and a method, performed by the processor 2200, of calculating the degree of similarity between the first and second feature vectors by using the similarity degree calculation module 2334 is not limited to Equation 2.

The comparison module 2336 is a module configured to compare the degree of overlap between the first and second ROIs, which is calculated using the overlap degree calculation module 2332, with a first threshold, and compare the degree of similarity between the first and second feature vectors, which is calculated using the similarity degree calculation module 2334, with a second threshold. For example, the first threshold may be 0.8, and the second threshold may be 0.5. However, numerical values of the first threshold and the second threshold are not limited to those described above. The processor 2200 may compare the degree of overlap between the first and second ROIs with the first threshold and compare the degree of similarity between the first and second feature vectors with the second threshold by using data and program code in the comparison module 2336.

The comparison module 2336 may provide information about comparison results to the compression ratio adjustment module 2340.

The compression ratio adjustment module 2340 is a module for determining a compression ratio at which the raw image is compressed to obtain the reconstructed image, based on whether the target object is recognized, which is determined by the recognition result determination module 2330. Here, a 'compression ratio' represents an image compression parameter for encoding a raw image by using a method that matches a standard specification. Compression ratios may exist in various forms for each standard specification. For example, in standards for playing a video (e.g., H.264/AVC, HEVC (H.265), etc.), a compression ratio of an image may be determined based on a quantization parameter. In an embodiment, the compression ratio adjustment module 2340 may be configured to determine a value of a quantization parameter based on results of respectively comparing the degree of overlap and the degree of similarity obtained from the recognition result determination module 2330 with preset thresholds.

A 'quantization parameter' is a parameter indicating a degree of quantization of transform coefficients defined in a standard related to compression of a video, e.g., H.264/AVC or HEVC (H.265), and may be used to determine a compression ratio of an image. In an embodiment, a compression ratio is proportional to a value of a quantization parameter. For example, when the value of the quantization parameter is large, the compression ratio is high, and when the value of the quantization parameter is small, the compression ratio is low.

The compression ratio adjustment module 2340 may be configured to adjust a value of a compression ratio based on the comparison results provided by the comparison module 2336. In an embodiment, by using data and program code in the compression ratio adjustment module 2340, the processor 2200 may adjust a value of a quantization parameter, based on a result of comparing the degree of overlap between the first and second ROIs with the first threshold and a result of comparing the degree of similarity between the first and second feature vectors with the second threshold. The compression ratio adjustment module 2340 may change the value of the compression ratio by a preset unit.

In an embodiment, the processor 2200 may change the value of the compression ratio when the degree of overlap is less than or equal to the first threshold or the degree of similarity is less than or equal to the second threshold as a result of comparison using the comparison module 2336. In this case, the processor 2200 may change the value of the compression ratio to a value lower than a compression ratio used to compress and encode the previously reconstructed image. In an embodiment, when the degree of overlap exceeds the first threshold and the degree of similarity exceeds the second threshold as a result of comparison using the comparison module 2336, the processor 2200 may determine the compression ratio used to generate the reconstructed image as a final compression ratio.

The processing device 2000 transmits, to the IP camera 1000, information about a compression ratio determined according to whether an object is recognized via the network interface 2100 (operation S110). In an embodiment, when the degree of overlap is less than or equal to the first threshold or the degree of similarity is less than or equal to the second threshold, the processor 2200 may transmit information about a changed compression ratio value to the IP camera 1000 via the network interface 2100. In this case, the processor 2200 may repeat at least once operations of receiving, from the IP camera 1000, via the network interface 2100, image data of a reconstructed image generated through compression using the changed compression ratio, encoding, and decoding, recognizing a target object in the received reconstructed image and extracting a second feature vector from the target object, calculating the degree of overlap, calculating the degree of similarity, determining whether the target object is correctly recognized, and readjusting a compression ratio.

In an embodiment, when the degree of overlap exceeds the first threshold and the degree of similarity exceeds the second threshold, the processor 2200 may transmit information about a value of a final compression ratio to the IP camera 1000 via the network interface 2100.

The IP camera 1000 may receive information about a compression ratio via the network interface 1400 and generate a bitstream by compressing the raw image using the received compression ratio and encoding the compressed raw image.

The IP camera 1000 may transmit, to an external server 200, the bitstream generated by compressing the raw image at the determined compression ratio via the network interface 1400 (operation S120). In an embodiment, the IP camera 1000 may transmit the bitstream to the server 200 through a gateway. The gateway may connect the IP camera system 100 to the server 200 using a wired or wireless communication method. The server 200 may store the bitstream received from the IP camera 1000 in a storage 210.

Figure 1B:
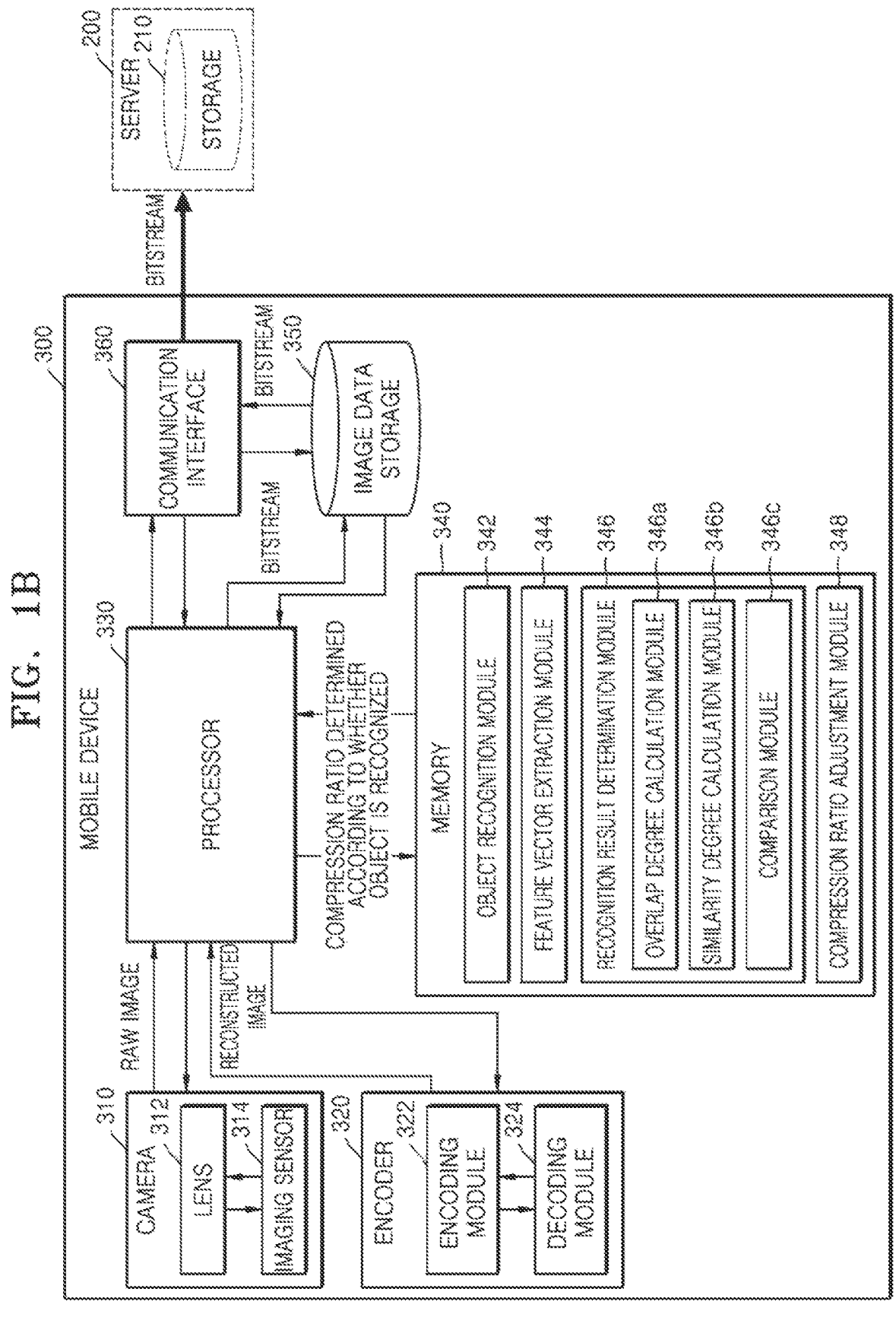
FIG. 1B is a block diagram illustrating a structure of a mobile device according to an embodiment of the present disclosure.

FIG. 1B is a block diagram illustrating a structure of a mobile device 300 according to an embodiment of the present disclosure.

The mobile device 300 may be an electronic device that processes a video obtained from a camera 310 and performs various calculations. For example, the mobile device 300 may be at least one of a smartphone, a tablet personal computer (PC), a mobile phone, a video phone, an e-book reader, or a desktop PC, a laptop PC, a netbook computer, a workstation, a personal digital assistant (PDA), a portable multimedia player (PMP), an MP3 player, a mobile medical device, and a wearable device.

Referring to FIG. 1B, the mobile device 300 may include a camera 310, an encoder 320, a processor 330, a memory 340, an image data storage 350, and a communication interface 360.

The camera 310 may include a lens 312 and an imaging sensor 314. The camera 310 may image an object through the lens 312 and obtain an image of the object via the imaging sensor 314. The image obtained via the imaging sensor 314 is a raw image corresponding to uncompressed image data. The imaging sensor 314 may include a photodiode array. The imaging sensor 314 may include, for example, a CCD module or a CMOS module, but is not limited thereto.

The encoder 320 is configured to generate a reconstructed image by compressing, encoding, and decoding a raw image using at least one of the image compression standards, for example, H.264/AVC and HEVC (H.265).

The encoder 320 may include an encoding module 322 and a decoding module 324. The encoding module 322 may be configured to encode an input image, i.e., a raw image, using a preset compression ratio and obtain encoded image data from the raw image. In an embodiment, by using the encoding module 322, the processor 330 may obtain prediction data from an input image, i.e., a raw image, via inter-prediction and intra-prediction, obtain residual data produced by subtracting the prediction data from the raw image, and obtain encoded image data by performing transformation and quantization on the residual data. For example, the encoded image data may be quantized transform coefficients.

The decoding module 324 may be configured to generate a reconstructed image by decoding the encoded image data. In an embodiment, by using the decoding module 324, the processor 330 may reconstruct the residual data by performing inverse quantization and inverse transform on the encoded image data, i.e., the quantized transform coefficients, and obtain a reconstructed image by adding the prediction data obtained via inter-prediction and intra-prediction to the reconstructed residual data.

Because the encoding module 322 and the decoding module 324 shown in FIG. 1B perform the same functions and/or operations as the encoding module 1320 and the decoding module 1330 shown in FIG. 1A, descriptions that are already provided above are omitted.

By executing at least one program code or instructions stored in the memory 340, the processor 330 may determine whether a target object is accurately recognized in the raw image and the reconstructed image and determine a compression ratio for obtaining the reconstructed image based on a determining result. The processor 330 may be composed of hardware components for performing arithmetic, logic and input/output (I/O) operations and signal processing. In an embodiment, the processor 330 may be an AP configured to execute an application program developed for the mobile device 300. However, the processor 330 is not limited thereto, and for example, it may include at least one of a CPU, a microprocessor, a GPU, ASICs, DSPs, DSPDs, PLDs, or FPGAs.

The memory 340 may include, for example, at least one of a flash memory-type memory, a hard disk-type memory, a multimedia card micro-type memory, a card-type memory (e.g., an SD card or an XD memory), RAM, SRAM, ROM, EEPROM, PROM, magnetic memory, magnetic disks, or optical disks.

The memory 340 may store a program including instructions related to execution of a function or operation of determining a compression ratio for encoding the raw image based on regions in which target objects are detected respectively in the raw image and the reconstructed image and feature vectors extracted from the target objects. The memory 340 may store at least one of instructions, algorithms, data structures, and program code that are readable by the processor 330. The instructions, algorithms, data structures, and program code stored in the memory 340 may be implemented by a programming or scripting language, such as C, C++, Java, assembler, etc.

The memory 340 may include an object recognition module 342, a feature vector extraction module 344, a recognition result determination module 346, and a compression ratio adjustment module 348.

The object recognition module 342 is a module for recognizing a target object from a video. In an embodiment, the processor 330 may detect a target object in each of the raw image and the reconstructed image by using data and program code in the object recognition module 342.

The feature vector extraction module 344 is a module for extracting a feature vector from an image of a detected target object. The processor 330 may extract a feature vector from an image of a target object by using data and program code in the feature vector extraction module 344. In an embodiment, the processor 330 may extract a first feature vector from an image of a target object recognized in the raw image and extract a second feature vector from an image of the target object recognized in the reconstructed image.

The recognition result determination module 346 is a module for determining whether the target object is correctly recognized in the reconstructed image, based on a degree of overlap between ROIs detected respectively in the raw image and the reconstructed image and a degree of similarity between feature vectors respectively extracted from the raw image and the reconstructed image. The recognition result determination module 346 may include an overlap degree calculation module 346a, a similarity degree calculation module 346b, and a comparison module 346c.

The overlap degree calculation module 346a is a module for calculating the degree of overlap among two or more images and outputting a resulting value. In an embodiment, by using data and program code in the overlap degree calculation module 346a, the processor 330 may calculate a degree of overlap between the first ROI including the target object recognized in the raw image and the second ROI including the target object recognized in the reconstructed image, based on coordinate value information of a bounding box of the first ROI and coordinate value information of a bounding box of the second ROI.

The similarity degree calculation module 346b is a module for calculating a degree of similarity between two feature vectors as a numerical value. In an embodiment, by using data and program code in the similarity degree calculation module 346b, the processor 330 may calculate, as a numerical value, a degree of similarity between the first feature vector extracted from the target object detected in the raw image and the second feature vector extracted from the target object detected in the reconstructed image.

The comparison module 346c is a module configured to compare the degree of overlap between the first and second ROIs, which is calculated using the overlap degree calculation module 346a, with a first threshold, and compare the degree of similarity between the first and second feature vectors, which is calculated using the similarity degree calculation module 346b, with a second threshold. The processor 330 may compare the degree of overlap between the first and second ROIs with the first threshold and compare the degree of similarity between the first and second feature vectors with the second threshold by using data and program code in the comparison module 346c.

The compression ratio adjustment module 348 is a module for determining a compression ratio at which the raw image is compressed to obtain the reconstructed image, based on whether the target object is recognized, which is determined by the recognition result determination module 346. In an embodiment, by using data and program code in the compression ratio adjustment module 348, the processor 330 may adjust a value of a quantization parameter, based on a result of comparing the degree of overlap between the first and second ROIs with the first threshold and a result of comparing the degree of similarity between the first and second feature vectors with the second threshold.

Because the object recognition module 342, the feature vector extraction module 344, the recognition result determination module 346, and the compression ratio adjustment module 348 stored in the memory 340 respectively correspond to the object recognition module 2310, the feature vector extraction module 2320, the recognition result determination module 2330, and the compression ratio adjustment module 2340, descriptions thereof that are already provided above are omitted.

In an embodiment, the processor 330 may change a value of a compression ratio when the degree of overlap is less than or equal to the first threshold or the degree of similarity is less than or equal to the second threshold. In this case, the processor 330 may change the value of the compression ratio to a value lower than a compression ratio used to compress and encode the previously reconstructed image. In an embodiment, when the degree of overlap exceeds the first threshold and the degree of similarity exceeds the second threshold, the processor 330 may determine the compression ratio used to generate the reconstructed image as a final compression ratio.

The processor 330 may generate a bitstream by compressing the raw image using the determined compression ratio and encoding the compressed raw image. In an embodiment, the processor 330 may store the generated bitstream in an image data storage 350.

The image data storage 350 is a storage device configured to store image data generated by the processor 330. The image data storage 350 may include a non-volatile memory. For example, the image data storage 350 may include at least one non-volatile memory among a flash memory-type memory, a hard disk-type memory, a multimedia card micro-type memory, a card-type memory (e.g., an SD card or an XD memory), a magnetic memory, a magnetic disk, and an optical disk.

In an embodiment, the bitstream stored in the image data storage 350 may be transmitted to the communication interface 360 according to control by the processor 330.

The communication interface 360 may perform data transmission and reception between the mobile device 300 and a server 200. The communication interface 360 may transmit or receive data to or from the server 200 by using a wireless communication method including at least one of a wireless LAN, Wi-Fi, WFD, wireless broadband Internet (WiBro), World Interoperability for Microwave Access (WiMAX), shared wireless access protocol (SWAP), and WiGig. In an embodiment, the processor 330 may transmit the bitstream to the server 200 using the communication interface 360.

The server 200 may store the bitstream received from the mobile device 300 in a storage 210.

Figure 2:
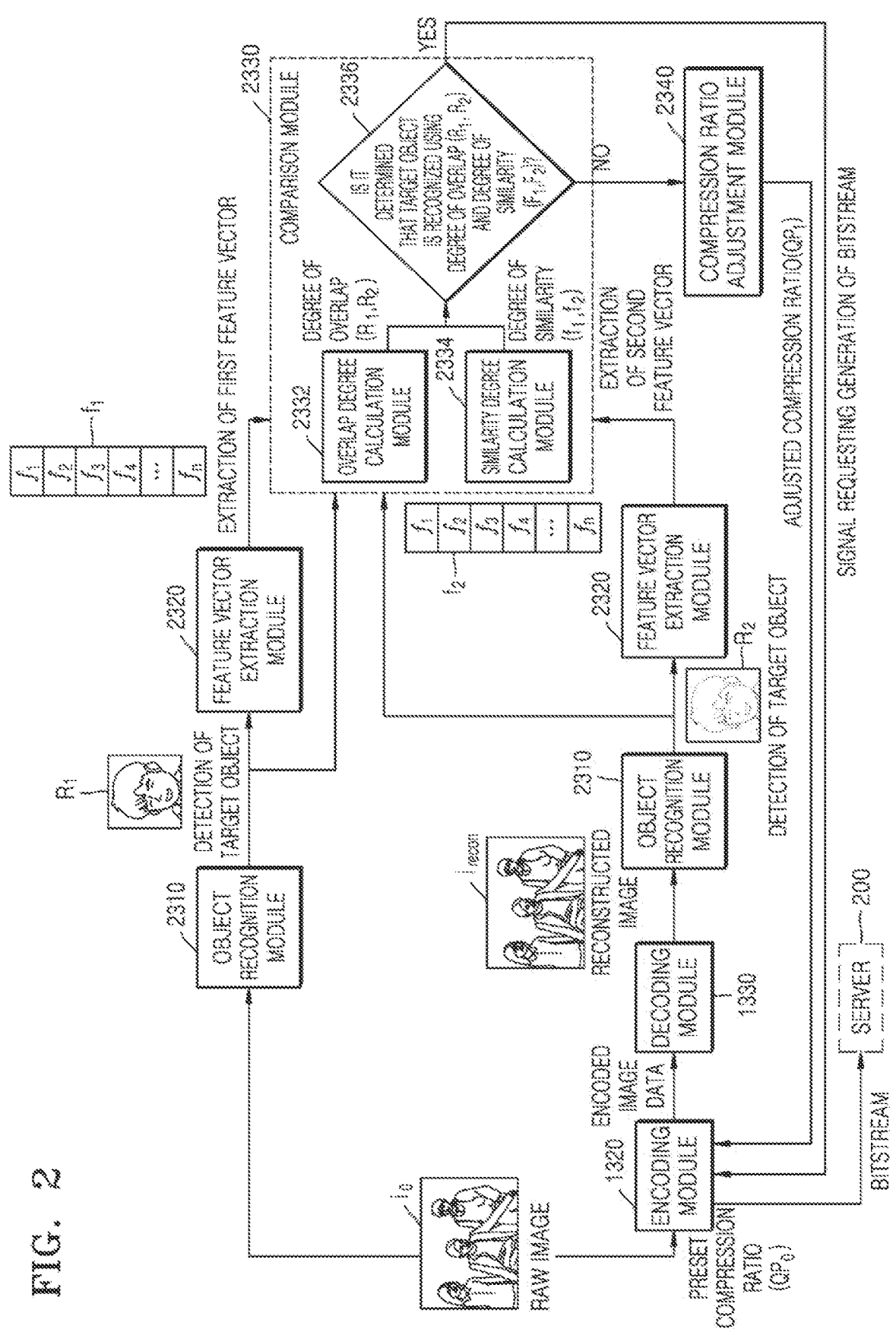
FIG. 2 is a diagram illustrating a flow of data through modules included in an IP camera system, according to an embodiment of the present disclosure.

FIG. 2 is a diagram illustrating a flow of data through modules included in a device, according to an embodiment of the present disclosure.

In the present disclosure, the 'device' may include the IP camera system 100 or the mobile device 300. Hereinafter, for convenience of description, components of the IP camera system 100 are described as an example of the device.

Referring to FIG. 2, a raw image $i_o$ may be input to the object recognition module 2310 and the encoding module 1320. The raw image $i_o$ may be obtained by capturing an image of a target area or a target object being monitored via the imaging sensor (1100 of FIG. 1A).

The raw image $i_o$ is input to the object recognition module 2310, and the object recognition module 2310 may detect a target object in the raw image $i_o$. In an embodiment, the target object may include at least one of a person's face, hairstyle, clothing, and posture, but is not limited thereto. The object recognition module 2310 may detect a first ROI $R_1$ including the detected target object in the raw image $i_o$. The first ROI $R_1$ may be an image of a target object, e.g., a bounding box including a person's face.

The target object detected in the raw image $i_o$ is input to the feature vector extraction module 2320, and the feature vector extraction module 2320 may extract a first feature vector $f_1$ from the image of the target object. The first feature vector $f_1$ may be, for example, a vector including feature values corresponding to landmarks, such as the eyes, the nose, and the mouth of a person's face. However, the first feature vector $f_1$ is not limited thereto, and may be a vector including feature values corresponding to at least one keypoint extracted from a person's hairstyle, clothing, or a specific posture.

The first ROI $R_1$ detected in the raw image $i_o$ and the first feature vector $f_1$ extracted from the target object may be input to the recognition result determination module 2330.

When the raw image $i_o$ is input to the encoding module 1320, the encoding module 1320 may compress and encode the raw image $i_o$ using a preset compression ratio $QP_0$ to output encoded image data. In an embodiment, the encoded image data may be quantized transform coefficients.

The encoded image data is input to the decoding module 1330, and the decoding module 1330 may reconstruct residual data by performing inverse quantization and inverse transform on the encoded image data. The decoding module 1330 may obtain a reconstructed image $i_{recon}$ by adding prediction data obtained via inter-prediction and intra-prediction to the reconstructed residual data.

The reconstructed image $i_{recon}$ is input to the object recognition module 2310, and the object recognition module 2310 may detect a target object in the reconstructed image $i_{recon}$. The target object detected in the reconstructed image $i_{recon}$ may be the same as the target object detected in the raw image $i_o$, but image quality, such as the resolution and sharpness of an image of the target object, may be lower than that of an image of the target object detected in the raw image $i_o$. The object recognition module 2310 may detect a second ROI $R_2$ including the target object detected in the reconstructed image $i_{recon}$. The second ROI $R_2$ may be an image of a target object, e.g., a bounding box including a person's face.

The target object detected in the reconstructed image $i_{recon}$ is input to the feature vector extraction module 2320, and the feature vector extraction module 2320 may extract the second feature vector $f_2$ from the image of the target object detected in the reconstructed image $i_{recon}$. Because the second feature vector $f_2$ is the same as the first feature vector $f_1$ except that it is extracted from the image of the target object detected in the reconstructed image $i_{recon}$, descriptions already provided above are omitted.

The second ROI $R_2$ detected in the reconstructed image $i_{recon}$ and the second feature vector $f_2$ extracted from the target object may be input to the recognition result determination module 2330.

The overlap degree calculation module 2332 may calculate a degree of overlap between the first ROI $R_1$ and the second ROI $R_2$, based on coordinate value information of the bounding box of the first ROI $R_1$ and coordinate value information of the bounding box of the second ROI $R_2$. In an embodiment, the overlap degree calculation module 2332 may calculate the degree of overlap between the first ROI $R_1$ and the second ROI $R_2$ by using an IoU method. The overlap degree calculation module 2332 may provide information about the calculated degree of overlap to the comparison module 2336.

The similarity degree calculation module 2334 may calculate a degree of similarity between the first feature vector $f_1$ and the second feature vector $f_2$. In an embodiment, the similarity degree calculation module 2334 may calculate the degree of similarity representing a correlation between the first feature vector $f_1$ and the second feature vector $f_2$ as a numerical value, and provide information about the calculated degree of similarity to the comparison module 2336.

The comparison module 2336 may determine whether the target object is correctly recognized by using the degree of overlap $(R_1, R_2)$ input from the overlap degree calculation module 2332 and the degree of similarity $(f_1, f_2)$ input from the similarity degree calculating module 2334. In an embodiment, the comparison module 2336 may determine whether the target object is correctly recognized in the reconstructed image $i_{recon}$ comparing a value of the degree of overlap $(R_1, R_2)$ with a first threshold and comparing a value of the degree of similarity $(f_1, f_2)$ with a second threshold.

For example, the comparison module 2336 determines that the target object is not correctly recognized in the reconstructed image $i_{recon}$ when the value of the degree of overlap $(R_1, R_2)$ is less than or equal to the first threshold or the value of the degree of similarity $(f_1, f_2)$ are less than or equal to the second threshold. In this case, the comparison module 2336 provides a result of determining whether the target object is recognized to the compression ratio adjustment module 2340.

When a result of determination that the target object is not correctly recognized is input from the comparison module 2336, the compression ratio adjustment module 2340 may adjust a compression ratio to a first compression ratio $QP_1$ that is lower than the value of the preset compression ratio $QP_0$ used to obtain the reconstructed image $i_{recon}$. The compression ratio adjustment module 2340 may provide the encoding module 1320 with information about the value of the first compression ratio $QP_1$ that is an adjusted compression ratio.

The encoding module 1320 may obtain encoded image data by compressing the raw image $i_o$ using the value of the first compression ratio $QP_1$ input from the compression ratio adjustment module 2340 and encoding the compressed raw image $i_o$. Operations performed by the decoding module 1330, the object recognition module 2310, the feature vector extraction module 2320, the recognition result determination module 2330, and the compression ratio adjustment module 2340 are repeatedly performed as the image data obtained by compressing and encoding the raw image $i_o$ is input.

In another example, when the value of the degree of overlap $(R_1, R_2)$ exceeds the first threshold and the value of the degree of similarity $(f_1, f_2)$ exceeds the second threshold, the comparison module 2336 may determine that the target object is correctly recognized in the reconstructed image $i_{recon}$. In this case, the comparison module 2336 may transmit a signal requesting generation of a bitstream to the encoding module 1320.

When the signal requesting generation of the bitstream is input, the encoding module 1320 may generate a bitstream by compressing the raw image $i_o$ at the preset compression ratio $QP_0$ and encoding the compressed raw image $i_o$.

The encoding module 1320 may transmit the bitstream to the server 200. In this case, the encoding module 1320 may transmit the bitstream to the server 200 located outside via the network interface (1400 of FIG. 1A).

In a general surveillance camera system, due to constraints on storage capacity or network bandwidths, a video captured using a camera is compressed and encoded using a compression method complying with the standard (e.g., H.264/AVC, HEVC (H.265), etc.) and transmitted to the server 200. In this case, when encoding is performed at an excessively high compression ratio, the quality of an image degrades so that a face, hairstyle, clothing, etc. of a person to be recognized may not be identified in the image. Furthermore, in exceptional situations, such as limited network bandwidth, data packet loss due to network instability, an error in an encoding operation, data packet loss in a UDP environment, etc., a decoded image frame degrades, and a person's face and the like cannot be recognized in the degraded image frame. When the person's face cannot be recognized in the degraded image frame, the person is mistakenly recognized as another person, and thus, it is difficult to track an unauthorized person.

The devices according to the embodiments described with reference to FIGS. 1A, 1B, and 2 are capable of solving the above-described problems, i.e., increasing a recognition rate of a particular target object (e.g., a face, a hairstyle, clothing, a posture, etc.) even in exceptional situations, such as limited network bandwidth, data packet loss due to network instability, an error in an encoding operation, data packet loss in a UDP environment, etc. According to an embodiment of the present disclosure, the IP camera system 100 may recognize target objects respectively in a raw image and a reconstructed image obtained from the IP camera 1000, extract feature vectors from the target objects, and adjust a compression ratio of the reconstructed image, based on a degree of overlap between ROIs including the target objects and a degree of similarity between the feature vectors, thereby determining a compression ratio optimized for target object recognition. Accordingly, the IP camera system 100 of the present disclosure may significantly improve a recognition rate of a target object, e.g., a person's face, and reduce a false recognition rate.

FIG. 3 is a flowchart of a method, performed by a device, of processing an image, according to an embodiment of the present disclosure.

In the present disclosure, the 'device' may include the IP camera system 100 or the mobile device 300. Hereinafter, for convenience of description, a case in which the IP camera system 100, as an example of the device, performs operations of the method is described. The operations or functions described below may be performed equally by the mobile device 300.

In operation S310, the IP camera system 100 obtains a raw image from at least one imaging sensor (1100 of FIG. 1A). The raw image is image data obtained by capturing an image of a target area or target object being monitored via the imaging sensor 1100, and is uncompressed image data.

In operation S320, the IP camera system 100 obtains a reconstructed image by compressing the raw image at a preset compression ratio, encoding the compressed raw image into image data, and decoding the encoded image data. In an embodiment, the IP camera (1000 of FIG. 1A) may include the encoder (1310 of FIG. 1A), and use the encoder 1310 to compress raw image at a preset compression ratio, encode the compressed raw image, and decode the encoded image, thereby generating a reconstructed image. In an embodiment, the encoder 1310 included in the IP camera 1000 may compress, encode, and decode the raw image by using at least one of the image compression standards, for example, H.264/AVC and HEVC (H.265), to thereby generate a reconstructed image. The IP camera 1000 may transmit the raw image and the reconstructed image to the processing device (2000 of FIG. 1A). The processing device 2000 may receive image data of the raw image and image data of the reconstructed image from the IP camera 1000 via the network interface (2100 of FIG. 1A).

In operation S330, the IP camera system 100 detects, in the raw image, a target object and a first ROI including the target object, and extracts a first feature vector from the target object. For example, the target object may include at least one of a person's face, hairstyle, clothing, and posture. In an embodiment, by using a known image processing technique or an AI model including deep learning, the IP camera system 100 may recognize the target object in the raw image and extract the first feature vector from the recognized target object.

In an embodiment, the processor (2200 of FIG. 1A) of the processing device 2000 may detect a target object in the raw image by performing training via a CNN model. The processor 2200 may detect the target object in the raw image by using trained model parameters of the CNN model. For example, when the target object is a face, the processor 2200 may detect a person's face in the raw image by using a large scale dataset, such as CASIA-WebFace, VGGFaceNGGFace 2, or MS-Celeb-1M.

In an embodiment, the processor 2200 may extract the first feature vector from an image of the target object by using a known image processing technique or an AI model including deep learning. For example, the processor 2200 may extract the first feature vector from the image of the target object by using an ICA or PCA method.

In an embodiment, the processor 2200 may extract the first feature vector from the image of the target object by using a CNN model. For example, the processor 2200 may extract feature values by striding over the image of the target object using a kernel having a predetermined size and predetermined number of channels, obtain a plurality of layers including the extracted feature values, and obtain a feature vector map by applying weights to the plurality of layers. An ReLU model may be used in the process of obtaining a feature vector value, and in order to improve the efficiency of the CNN model, an operation of normalizing feature values through dropout and an operation of performing pooling or max pooling may be further added. The processor 2200 may extract the first feature vector from the image of the target object detected in the raw image by using a CNN model, such as MobileNet v1/v2.

In operation S340, the IP camera system 100 recognizes, in the reconstructed image, a target object and a second ROI including the target object, and extracts a second feature vector from the target object. Because the target object is recognized and the second feature vector is extracted from the 'reconstructed image' instead of the raw image in operation S340, operation S340 is performed in the same manner as operation S330 except for only a difference in the image from which the target object is recognized and the second feature vector is extracted. Therefore, descriptions already provided above with respect to operation S330 are omitted.

In operation S350, the IP camera system 100 determines whether the target object is correctly recognized based on a degree of overlap between the first and second ROIs and a degree of similarity between the first and second feature vectors. In an embodiment, the processor 2200 of the processing device 2000 may calculate the degree of overlap between the first ROI and the second ROI and the degree of similarity between the first feature vector and the second feature vector. In an embodiment, the processor 2200 may compare the calculated degree of overlap with a first threshold, compare the calculated degree of similarity with a second threshold, and determine whether the target object is correctly recognized in the reconstructed image based on comparison results.

Here, a 'compression ratio' represents an image compression parameter for encoding a raw image by using a method that matches a standard specification. Compression ratios may exist in various forms for each standard specification. For example, in standards for playing video (e.g., H.264/AVC, HEVC (H.265), etc.), a compression ratio of an image may be determined based on a quantization parameter.

A 'quantization parameter' is a parameter indicating a degree of quantization of transform coefficients defined in a standard related to compression of video, e.g., H.264/AVC or HEVC (H.265), and may be used to determine a compression ratio of an image. In an embodiment, a compression ratio is proportional to a value of a quantization parameter. For example, when the value of the quantization parameter is large, the compression ratio is high, and when the value of the quantization parameter is small, the compression ratio is low.

In an embodiment, when the degree of overlap is less than or equal to the first threshold or the degree of similarity is less than or equal to the second threshold, the processor 2200 may determine that the target object is not correctly recognized in the reconstructed image.

In an embodiment, when the degree of overlap exceeds the first threshold and the degree of similarity exceeds the second threshold, the processor 2200 may determine that the target object is correctly recognized in the reconstructed image.

In operation S360, the IP camera system 100 may adjust a compression ratio based on a result of determining whether the target object is recognized. In an embodiment, when it is determined that the target object is not correctly recognized in the reconstructed image, the IP camera system 100 may change a value of the compression ratio to a value lower than a compression ratio used to compress and encode the previously reconstructed image. In an embodiment, when it is determined that the target object is correctly recognized in the reconstructed image, the IP camera system 100 may determine the compression ratio used to generate the reconstructed image obtained in operation S320 as a final compression ratio.

Detailed embodiments of operations S350 and S360 are described in detail with reference to FIGS. 4 and 5.

Figure 4:
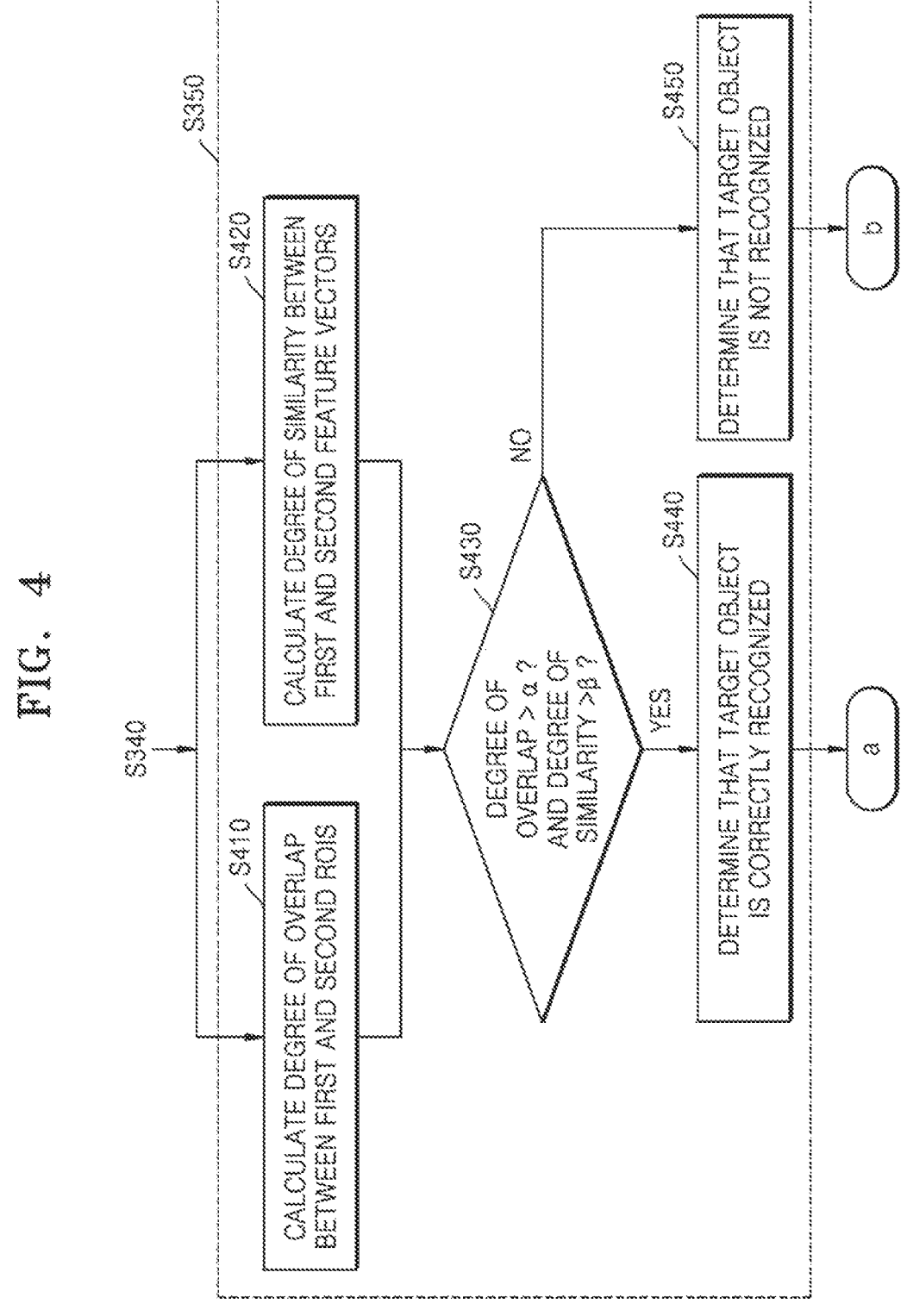
FIG. 4 is a flowchart of a method, performed by a device, of determining whether a target object is recognized in a reconstructed image, according to an embodiment of the present disclosure.

FIG. 4 is a flowchart of a method, performed by a device, of determining whether a target object is recognized in a reconstructed image, according to an embodiment of the present disclosure.

In the present disclosure, the 'device' may include the IP camera system 100 or the mobile device 300. Hereinafter, for convenience of description, a case in which the IP camera system 100, as an example of the device, performs operations of the method is described. The operations or functions described below may be performed equally by the mobile device 300.

Operations S410 to S450 shown in FIG. 4 are concrete operations of operation S350 shown in FIG. 3. Operation S340 shown in FIG. 4 is the same as those shown in FIG. 3. Operations S410 and S420 shown in FIG. 4 are performed after operation S340 shown in FIG. 3 is performed.

In operation S410, the IP camera system 100 calculates a degree of overlap between the first ROI and the second ROI. In an embodiment, the IP camera system 100 may obtain position coordinate value information of a bounding box of the first ROI including the target object detected in the raw image and position coordinate value information of a bounding box of the second ROI including the target object detected in the reconstructed image, and calculate the degree of overlap indicating the degree to which the first and second ROIs overlap by using the obtained position coordinate values. In an embodiment, the processor (2200 of FIG. 1A) of the processing device (2000 of FIG. 1A) may calculate the degree of overlap between the first and second ROIs by using an IoU method for calculating the degree of overlap using position coordinate value information.

In operation S420, the IP camera system 100 calculates a degree of similarity between the first feature vector and the second feature vector. By using a known method for calculating a correlation between vectors, the processor 2200 of the processing device 2000 may calculate the degree of similarity between the first feature vector extracted from the image of the target object detected in the raw image and the second feature vector extracted from the image of the target object detected in the reconstructed image.

In FIG. 4, operations S410 and S420 may be performed simultaneously and independently. However, the present disclosure is not limited thereto, and operation S410 may be performed before operation S420, or operation S420 may be performed before operation S410.

In operation S430, the IP camera system 100 may compare the degree of overlap calculated in operation S410 with a first threshold $\alpha$, and compare the degree of similarity calculated in operation S420 with a second threshold $\beta$. For example, the first threshold $\alpha$ may have a value of 0.8 and the second threshold $\beta$ may have a value of 0.5, but the first and second thresholds $\alpha$ and $\beta$ are not limited thereto.

When the degree of overlap exceeds the first threshold $\alpha$ and the degree of similarity exceeds the second threshold $\beta$ (operation S440), the IP camera system 100 determines that the target object is correctly recognized in the reconstructed image. When the target object is correctly recognized in the reconstructed image, the method is connected to Ⓐ of FIG.

Figure 5:
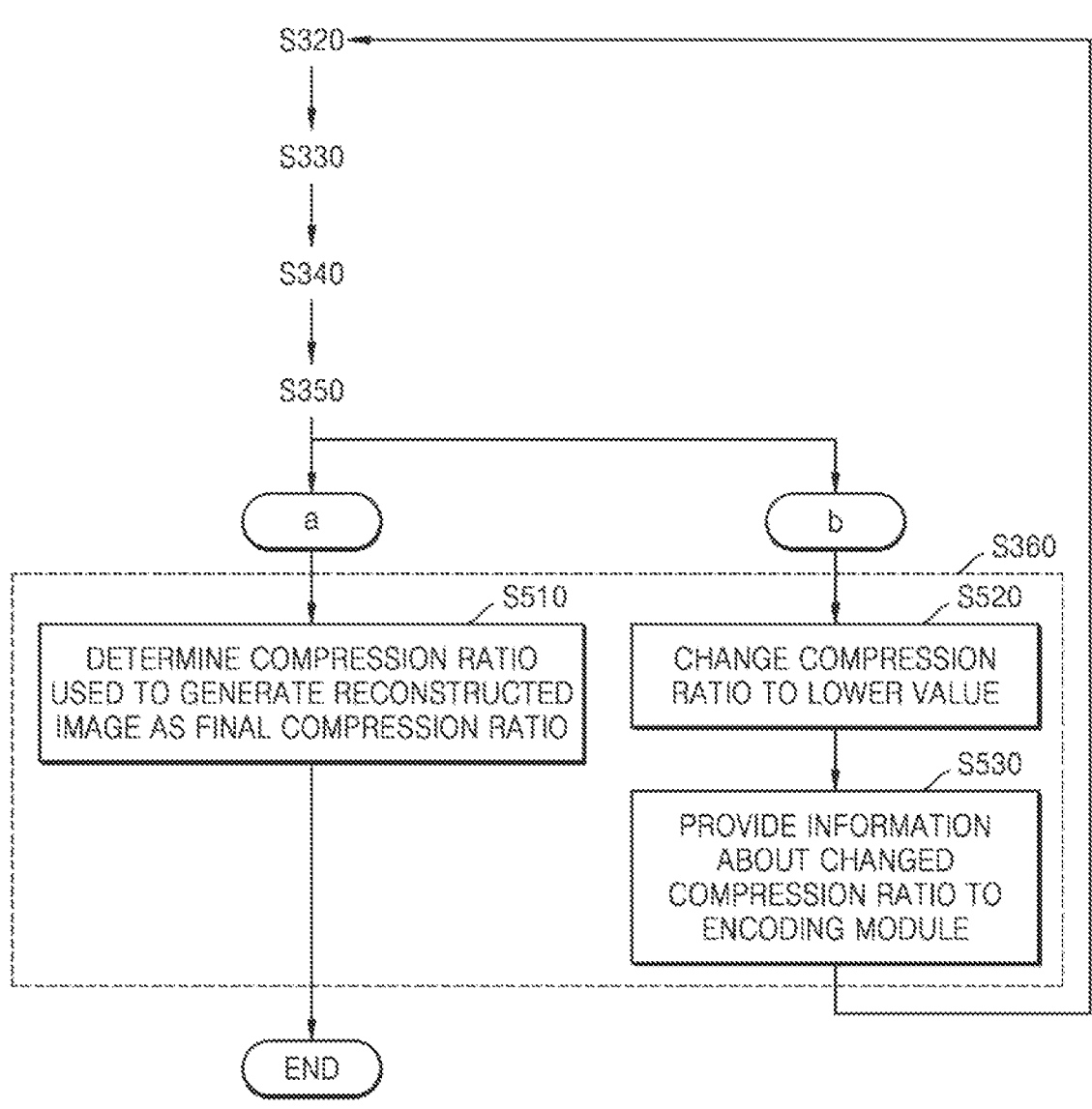
FIG. 5 is a flowchart of a method, performed by a device, of determining a compression ratio of an image based on a result of determining whether a target object is recognized, according to an embodiment of the present disclosure.

5, and after operation S440 of FIG. 4 is performed, operation S510 of FIG. 5 may be performed.

When the degree of overlap is less than or equal to the first threshold α or the degree of similarity is less than or equal to the second threshold β (operation S450), the IP camera system 100 determines that the target object is not correctly recognized in the reconstructed image. When the target object is correctly recognized in the reconstructed image, the method is connected to ⓐ of FIG. 5, and after operation S440 of FIG. 4 is performed, operation S510 of FIG. 5 may be performed.

FIG. 5 is a flowchart of a method, performed by a device, of determining a compression ratio of an image based on a result of determining whether a target object is recognized, according to an embodiment of the present disclosure.

In the present disclosure, the 'device' may include the IP camera system 100 or the mobile device 300. Hereinafter, for convenience of description, a case in which the IP camera system 100, as an example of the device, performs operations of the method is described. The operations or functions described below may be performed equally by the mobile device 300.

Operations S510 to S550 shown in FIG. 5 are concrete operations of operation S360 shown in FIG. 3. Operations S320, S330, and S340 shown in FIG. 5 are the same as those shown in FIG. 3.

In operation S510, the IP camera system 100 may determine the compression ratio, e.g., a value of a quantization parameter, used to generate the reconstructed image obtained in operation S320, as a final compression ratio. Operation S510 may be performed after operation S440 of FIG. 4 connected thereto through ⓐ is performed.

In operation S520, the IP camera system 100 changes the compression ratio to a lower value. Operation S520 may be performed after operation S450 of FIG. 4 connected thereto through ⓑ is performed. In an embodiment, the IP camera system 100 may adjust the compression ratio to a value lower than the compression ratio used to generate the reconstructed image obtained in operation S320. For example, the processor (2200 of FIG. 1A) of the processing device (2000 of FIG. 1A) may change the value of the quantization parameter used to generate the reconstructed image to a lower value.

In operation S530, the IP camera system 100 provides information about the changed compression ratio to the encoder (1310 of FIG. 1A) of the IP camera (1000 of FIG. 1A). In an embodiment, the processing device 2000 may transmit information about the changed value of the quantization parameter to the IP camera 1000 via the network interface (2100 of FIG. 1A).

After operation S530, the IP camera system 100 repeats operations S320, S330, S340, S350, and S360. In an embodiment, the IP camera 1000 may generate a reconstructed image based on the information about the compression ratio received from the processing device 2000 by compressing the raw image at the changed compression ratio, encoding the compressed raw image, and decoding the encoded image. The IP camera system 100 may repeat at least once operations of receiving the reconstructed image (operation S320), recognizing the target object in the raw image and extracting the first feature vector from the target object (operation S330), recognizing the target object in the received reconstructed image and extracting the second feature vector from the target object (operation S340), determining whether the target object is correctly recognized, based on the degree of overlap and the degree of similarity operation (operation S350), and adjusting a compression ratio (operation S360). The IP camera system 100 may repeat operations S320, S330, S340, S350, and S360 until the degree of overlap exceeds the first threshold α and the degree of similarity exceeds the second threshold β.

Figure 6:
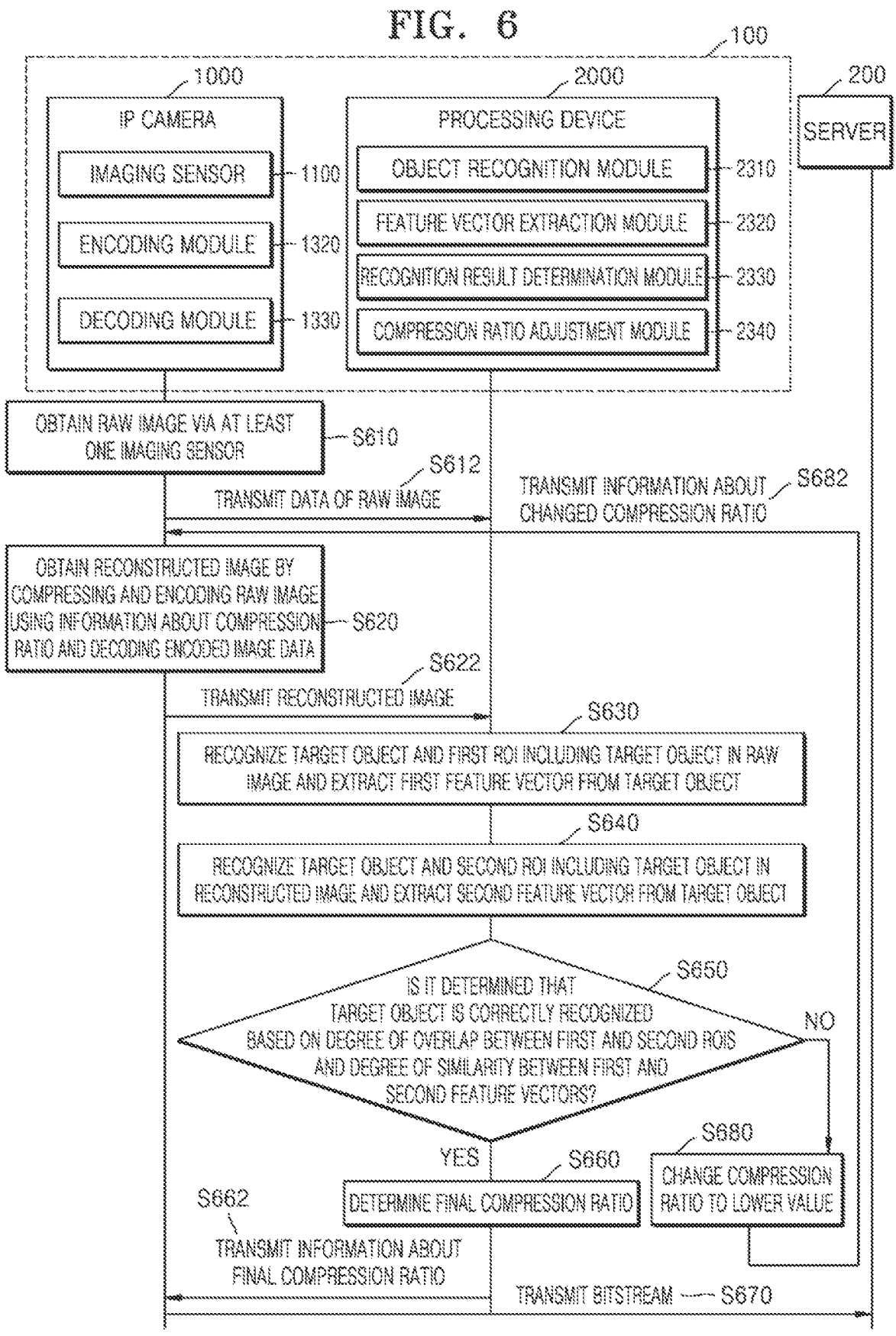
FIG. 6 is a flowchart of an operation method of an IP camera system and a server, according to an embodiment of the present disclosure.

FIG. 6 is a flowchart of an operation method of an IP camera system 100 and a server 200, according to an embodiment of the present disclosure.

Referring to FIG. 6, the IP camera system 100 may include an IP camera 1000 and a processing device 2000.

The IP camera 1000 may include an imaging sensor 1100, an encoding module 1320, and a decoding module 1330. Because the imaging sensor 1100, the encoding module 1320, and the decoding module 1330 are the same as the corresponding components shown in FIG. 1A, descriptions already provided above are omitted.

The processing device 2000 may include an object recognition module 2310, a feature vector extraction module 2320, a recognition result determination module 2330, and a compression ratio adjustment module 2340. Because the object recognition module 2310, the feature vector extraction module 2320, the recognition result determination module 2330, and the compression ratio adjustment module 2340 are the same as the corresponding components shown in FIG. 1A, descriptions already provided above are omitted.

In operation S610, the IP camera 1000 obtains a raw image using the imaging sensor 1100. In an embodiment, the IP camera 1000 may capture an image of a target area or target object being monitored via a lens and obtain a raw image of the target area or target object via the imaging sensor 1100. In an embodiment, the imaging sensor 1100 may be configured as one or a plurality of imaging sensors.

In operation S612, the IP camera 1000 transmits data of the raw image to the processing device 2000. The IP camera 1000 may transmit image data of the raw image to the processing device 2000 by using at least one of the wired and wireless communication methods including Ethernet, wired and wireless LANs, Wi-Fi, WFD, and WiGig.

In operation S620, the IP camera 1000 generates a reconstructed image by compressing the raw image using information about a compression ratio, encoding the compressed raw image, and decoding the encoded image. The IP camera 1000 may compress and encode the raw image using the encoding module 1320. The encoding module 1320 may be configured to encode the raw image at a preset compression ratio and obtain encoded image data from the raw image. In an embodiment, by using the encoding module 1320, the IP camera 1000 may obtain prediction data from the raw image via inter-prediction and intra-prediction, obtain residual data produced by subtracting the prediction data from the raw image, and obtain encoded image data by performing transformation and quantization on the residual data. For example, the encoded image data may be quantized transform coefficients.

By using the decoding module 1330, the IP camera 1000 may generate a reconstructed image by decoding the encoded image data. In an embodiment, by using the decoding module 1330, the IP camera 1000 may reconstruct the residual data by performing inverse quantization and inverse transform on the encoded image data, i.e., the quantized transform coefficients, and obtain a reconstructed image by adding the prediction data obtained via inter-prediction and intra-prediction to the reconstructed residual data.

In operation S622, the IP camera 1000 transmits data of the reconstructed image to the processing device 2000. Like in operation S612, the IP camera 1000 may transmit image data of the reconstructed image to the processing device 2000 by using at least one of the wired and wireless communication methods including Ethernet, wired and wireless LANs, Wi-Fi, WFD, and WiGig.

In operation S630, the processing device 2000 detects a target object and a first ROI including the target object in the raw image by using the object recognition module 2310, and extracts a first feature vector from the target object by using the feature vector extraction module 2320. For example, the target object may include at least one of a person's face, hairstyle, clothing, and posture. In an embodiment, by using a known image processing technique or an AI model including deep learning, the processing device 2000 may recognize the target object in the raw image and extract the first feature vector from the recognized target object.

Because operation S630 is the same as operation S330 shown in FIG. 3, descriptions already provided above are omitted.

In operation S640, the processing device 2000 recognizes a target object and a second ROI including the target object in the reconstructed image by using the object recognition module 2310, and extracts a second feature vector from the target object by using the feature vector extraction module 2320. Because the target object is recognized and the second feature vector is extracted from the 'reconstructed image' instead of the raw image in operation S640, operation S640 is performed in the same manner as the operation S630 except for only a difference in the image from which the target object is recognized and the second feature vector is extracted. Therefore, descriptions already provided above with respect to operation S630 are omitted.

In operation S650, the processing device 2000 determines whether the target object is correctly recognized, based on a degree of overlap between the first and second ROIs and a degree of similarity between the first and second feature vectors. In an embodiment, the processor (2200 of FIG. 1A) of the processing device 2000 may calculate the degree of overlap between the first ROI recognized in the raw image and the second ROI recognized in the reconstructed image by using the recognition result determination module 2330. In an embodiment, the processor 2200 may calculate the degree of similarity between the first feature vector extracted from the target object in the raw image and the second feature vector extracted from the target object in the reconstructed image by using the recognition result determination module 2330. In an embodiment, the processor 2200 may compare the calculated degree of overlap with a first threshold, compare the calculated degree of similarity with a second threshold, and determine whether the target object is correctly recognized in the reconstructed image based on comparison results.

When it is determined that the target object is correctly recognized in the reconstructed image (operation S60), the processing device 2000 may determine the compression ratio used to generate the reconstructed image as a final compression ratio. In an embodiment, by using the compression ratio adjustment module 2340, the processor 2200 of the processing device 2000 may obtain information about the compression ratio used when generating a reconstructed image by compressing and encoding the raw image in operation S620 and determine a value of the obtained compression ratio as a final compression ratio.

In operation S662, the processing device 2000 transmits information about the final compression ratio to the IP camera 1000. In an embodiment, the processor 2200 may transmit information about the final compression ratio to the IP camera 1000 via the network interface (2100 of FIG. 1A).

In operation S670, the IP camera 1000 transmits a bitstream to the server 200. In an embodiment, the IP camera

1000 may generate a bitstream by compressing the raw image at the final compression ratio determined based on the information about the final compression ratio received from the processing device 2000, and encoding the compressed raw image. The IP camera 1000 may transmit the generated bitstream to the server 200. In this case, the IP camera 1000 may transmit the bitstream to the server 200 located outside via the network interface (1400 of FIG. 1A).

When it is determined that the target object is not correctly recognized in the reconstructed image (operation S680), the processing device 2000 changes the compression ratio to a low value. In an embodiment, by using the compression ratio adjusting module 2340, the processor 2200 may change the value of the compression ratio to a value lower than the compression ratio used to generate the reconstructed image by compressing the raw image and encoding the compressed raw image in operation S620.

In operation S682, the processing device 2000 transmits information about the changed compression ratio to the IP camera 1000. In an embodiment, the processing device 2000 may transmit information about the compression ratio changed to a low value to the IP camera 1000 via the network interface 2100.

When the IP camera 1000 receives the information about the changed compression ratio in operation S682, the IP camera 1000 may perform operations S620 and S622 again, and the processing device 2000 may perform operations S630, S640, and 650 again. When the target object is not correctly recognized in the reconstructed image in operation S650 (If No), the processing device 2000 may perform operations S680 and S682 again. The processing device 2000 may repeat n times the operations of changing the value of the compression ratio to a lower value and transmitting information about the changed compression ratio to the IP camera until it is determined that the target object is correctly recognized in the reconstructed image in operation S650.

Figure 7:
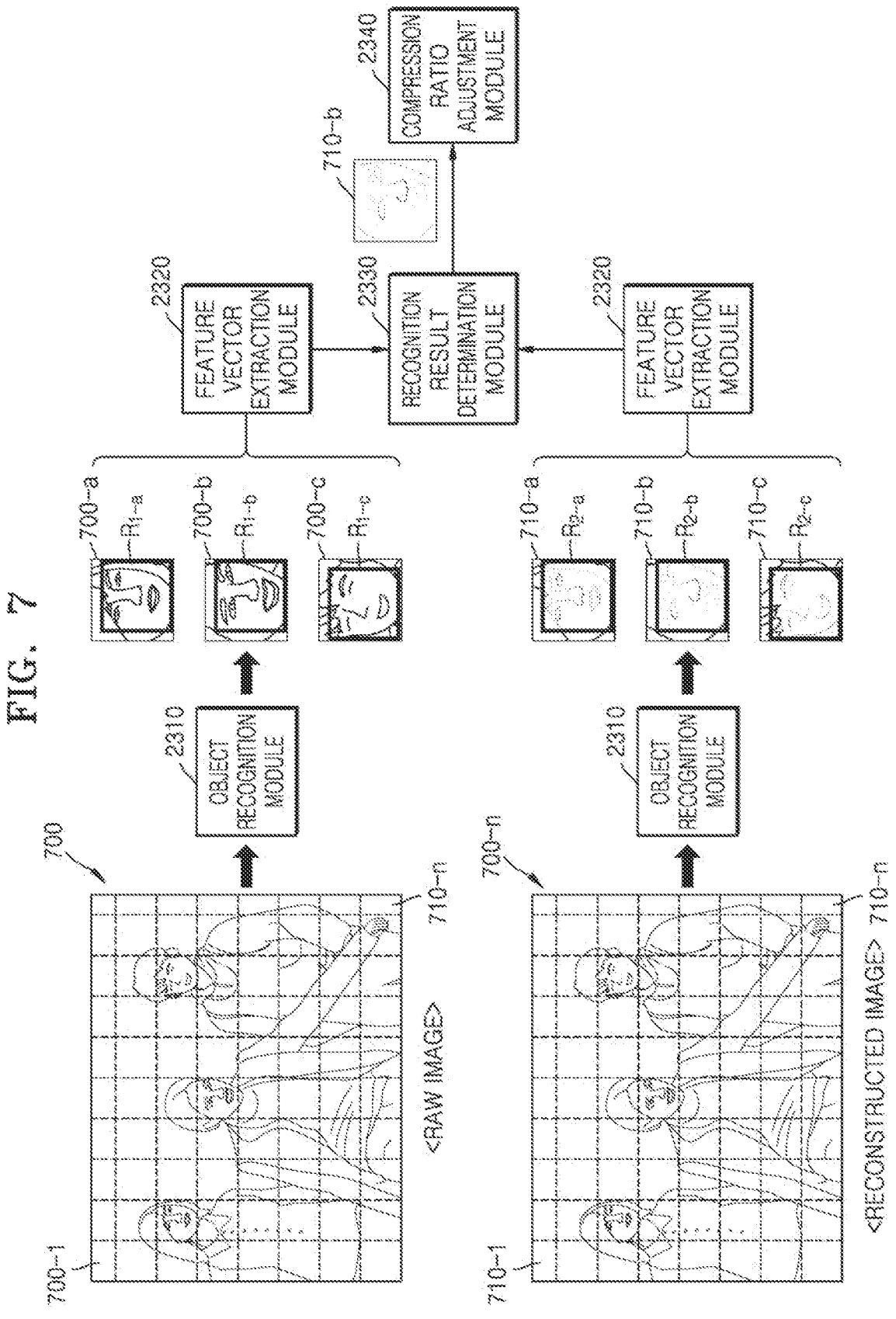
FIG. 7 is a diagram illustrating a method, performed by a device, of recognizing a target object according to a coding unit (CU) and adjusting a compression ratio for each CU based on a recognition result, according to an embodiment of the present disclosure.

FIG. 7 is a diagram illustrating a method, performed by a device, of recognizing a target object according to a coding unit (CU) and adjusting a compression ratio for each CU based on a recognition result, according to an embodiment of the present disclosure.

In the present disclosure, the 'device' may include the IP camera system 100 or the mobile device 300. Hereinafter, for convenience of description, a case in which the IP camera system 100, as an example of the device, performs operations of the method is described. The operations or functions described below may be performed equally by the mobile device 300.

Referring to FIG. 7, the processing device (2000 of FIG. 1A) of the IP camera system 100 may split each of the raw image 700 and the reconstructed image 710 obtained by the IP camera (1000 of FIG. 1A) according to a CU having a preset image size. In an embodiment, each CU may include a preset number of pixels. For example, each CU may include 16×16 or 64×64 pixels, and is not limited thereto. The processing device 2000 may split the raw image 700 into a plurality of CUs 700-1 to 700-n. Similarly, the processing device 2000 may split the reconstructed image 710 into a plurality of CUs 710-1 to 710-n. In an embodiment, the processing device 2000 may split each of the raw image 700 and the reconstructed image 710 in units of an LCU. For example, an LCU is a unit of coding including at least one CU.

The processing device 2000 may identify at least one first CU 700-a, 700-b, and 700-c in which a target object is recognized from among the plurality of CUs 700-1 to 700-n included in the raw image 700. In an embodiment, by using instructions or program code related to the object recognition module 2310, the processor (2200 of FIG. 1A) of the processing device 2000 may detect target objects in the raw image 700 and identify the at least one first CU 700-a, 700-b, and 700-c in which the target objects are respectively detected from among the plurality of CUs 700-1 to 700-n. A target object may include, for example, at least one of a person's face, hairstyle, clothing, and posture, but is not limited thereto. Although FIG. 7 shows the number of at least one first CUs 700-a, 700-b, and 700-c is 3, the number of CUs in which the target object is detected is not limited to 3.

The processor 2200 may identify bounding boxes of the target objects respectively detected in the at least one first CU 700-a, 700-b, and 700-c, and obtain position coordinate values of the identified bounding boxes. In an embodiment, the processor 2200 may respectively set the bounding boxes identified in the at least one first CU 700-a, 700-b, and 700-c to be at least one first ROI $R_{1-a}$, $R_{1-b}$, and $R_{1-c}$.

By using the instructions or program code related to the object recognition module 2310, the processor 2200 may detect target objects in the reconstructed image 710 and identify the at least one second CU 710-a, 710-b, and 710-c in which the target objects are respectively detected from among the plurality of CUs 710-1 to 710-n. By using the object recognition module 2310, the processor 2200 may identify bounding boxes of the target objects respectively detected in the at least one second CUs 710-a, 710-b, and 710-c, and respectively set the identified bounding boxes to be at least one second ROI $R_{2-a}$, $R_{2-b}$, and $R_{2-c}$.

The processing device 2000 may respectively extract first feature vectors from images of the target objects included in the at least one first ROI $R_{1-a}$, $R_{1-b}$, and $R_{1-c}$. In an embodiment, the processor 2200 may respectively extract the first feature vectors from the images of the target objects included in the at least one of the first ROI $R_{1-a}$, $R_{1-b}$, and by using instructions or program code related to the feature vector extraction module 2320. The feature vector extraction module 2320 may be configured to extract a feature vector from an image of a target object by using a known image processing method or an AI model including deep learning. For example, the feature vector extraction module 2320 may be configured to extract a feature vector from an image of a target object by using an ICA or PCA method.

In an embodiment, the processor 2200 may respectively extract second feature vectors from images of the target objects included in the at least one second ROI $R_{2-a}$, $R_{2-b}$, and $R_{2-c}$ by using the feature vector extraction module 2320.

The processing device 2000 may determine a result of recognizing a target object, based on a degree of overlap between each of the at least one first ROI $R_{1-a}$, $R_{1-b}$, and a corresponding one of the at least one second ROI $R_{2-a}$, $R_{2-b}$, and $R_{2-c}$, and a degree of similarity between the first and second feature vectors corresponding thereto In an embodiment, the processor 2200 may calculate the degree of overlap between the at least one first ROI $R_{1-a}$, $R_{1-b}$, $R_{1-c}$ and the at least one second ROI $R_{2-a}$, $R_{2-b}$, $R_{2-c}$ by using instructions or program code related to the recognition result determination module 2330. In an embodiment, the processor 2200 may calculate the degree of overlap between the at least one first ROI $R_{1-a}$, $R_{1-b}$, and $R_{1-c}$ and the at least one second ROI $R_{2-a}$, $R_{2-b}$, and $R_{2-c}$ by using an IoU method.

The processor 2200 may calculate the degree of similarity between the first and second feature vectors by using the recognition result determination module 2330. In an embodiment, by using the recognition result determination module 2330, the processor 2200 may calculate, as a numerical value, a correlation between the first feature vector extracted from the image of the target object included in the 1-a-th ROI $R_{1-a}$ and the second feature vector extracted from the image of the target object included in the 2-a-th ROI $R_{2-a}$. Similarly, the processor 2200 may calculate, as a numerical value, a correlation between the first feature vector extracted from the image of the target object included in the 1-b-th ROI $R_{1-b}$ and the second feature vector extracted from the image of the target object included in the 2-b-th ROI $R_{2-b}$.

By using the recognition result determination module 2330, the processor 2200 may determine whether a target object is accurately recognized by comparing the degree of overlap between the at least one first ROI $R_{1-a}$, $R_{1-b}$, and and the at least one second ROI $R_{2-a}$, $R_{2-b}$, and $R_{2-c}$ with a first threshold and comparing the degree of similarity between the first and second feature vectors with a second threshold. The processor 2200 may determine, based on comparison results, the CU 710-b in which the target object is not correctly recognized from among the at least one second CU 710-a, 710-b, and 710-c. In an embodiment, the processor 2200 may determine, as a CU in which the target object is not recognized, the CU 710-b for which the calculated degree of overlap is less than or equal to the first threshold or the degree of similarity is less than or equal to the second threshold from among the at least one second CU 710-a, 710-b, and 710-c.

The processing device 2000 adjusts a value of a compression ratio of the determined CU 710-b in which the target object is not recognized. In an embodiment, the processor 2200 may change the value of the compression ratio of the CU 710-b in which the target object is not recognized to a lower value by using instructions or program code related to the compression ratio adjustment module 2340.

In an embodiment, the processor 2200 may determine a value of a compression ratio used to generate the reconstructed image 710 as a final compression ratio for the 2-a-th CU 710-a and the 2-c-th CU 710-c that are determined as CUs in which the target objects are correctly recognized because the degree of overlap exceeds the first threshold and the degree of similarity exceeds the second threshold as a result of comparison via the recognition result determination module 2330.

Figure 8:
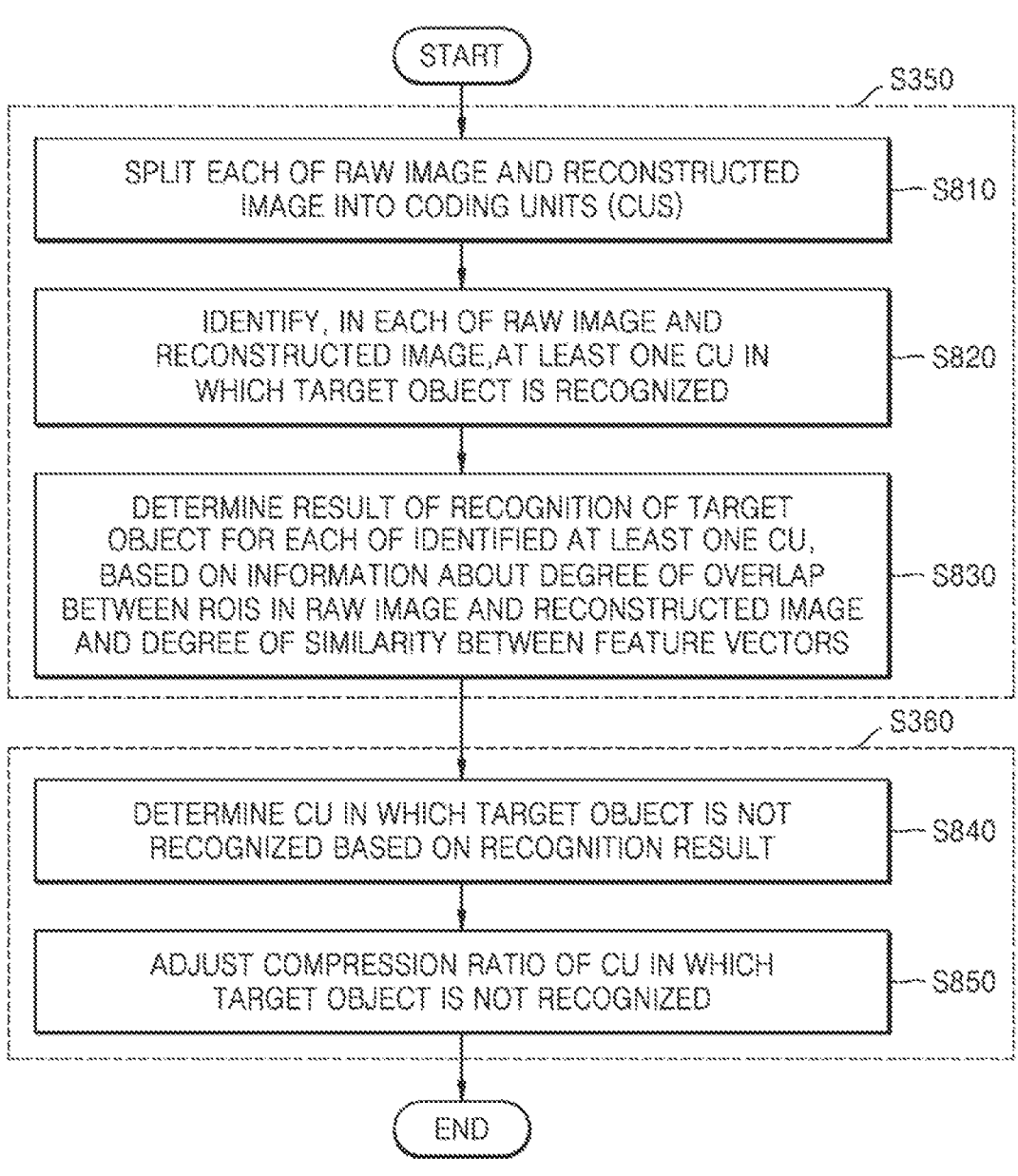
FIG. 8 is a flowchart of a method, performed by a device, of recognizing a target object according to a CU and adjusting a compression ratio for each CU based on a recognition result, according to an embodiment of the present disclosure.

FIG. 8 is a flowchart of a method, performed by a device, of recognizing a target object according to a CU and adjusting a compression ratio for each CU based on a recognition result, according to an embodiment of the present disclosure.

In the present disclosure, the 'device' may include the IP camera system 100 or the mobile device 300. Hereinafter, for convenience of description, a case in which the IP camera system 100, as an example of the device, performs operations of the method is described. The operations or functions described below may be performed equally by the mobile device 300.

Operations S810 to S830 shown in FIG. 8 are concrete operations of operation S350 shown in FIG. 3. Operations S840 and S850 shown in FIG. 8 are concrete operations of operation S360 shown in FIG. 3. Operation S810 shown in FIG. 8 may be performed after operation S340 shown in FIG. 3 is performed.

In operation S810, the IP camera system 100 splits each of the raw image and the reconstructed image according to a CU. In an embodiment, the processing device (2000 of FIG. 1A) of the IP camera system 100 may split each of the raw image and the reconstructed image obtained by the IP camera (1000 of FIG. 1A) according to a CU having a preset image size. In an embodiment, the processing device 2000 may split each of the raw image and the reconstructed image in units of an LCU.

In operation S820, the IP camera system 100 may identify, in each of the raw image and the reconstructed image, at least one CU in which a target object is recognized. In an embodiment, the processing device 2000 may identify at least one first CU in which a target object is recognized from among a plurality of CUs included in the raw image. Similarly, the processing device 2000 may identify at least one second CU in which target objects are respectively recognized from among a plurality of CUs included in the reconstructed image.

In operation S830, the IP camera system 100 determines a result of recognition of a target object for each of the identified at least one CU, based on information about a degree of overlap between ROIs in the raw image and the reconstructed image and a degree of similarity between feature vectors. In an embodiment, the processing device 2000 may identify bounding boxes for images of the target objects respectively included in the at least one first CU identified in the raw image and set the identified bounding boxes to be at least one first ROI. The processing device 2000 may identify bounding boxes for images of the target objects respectively included in the at least one second CU identified in the reconstructed image and set the identified bounding boxes to be at least one second ROI. In an embodiment, the processing device 2000 may calculate the degree of overlap between the at least one first ROI and the at least one second ROI. In an embodiment, the processing device 2000 may calculate the degree of overlap between the at least one first ROI and the at least one second ROI by using an IoU method.

The processing device 2000 may extract a first feature vector from the at least one first ROI and a second feature vector from the at least one second ROI. The processing device 2000 may calculate a degree of similarity between the first feature vector and the second feature vector. In an embodiment, the processing device 2000 may calculate a correlation between the first and second feature vectors as a numerical value.

The processing device 2000 may determine whether a target object is accurately recognized by comparing the degree of overlap between the at least one first ROI and the at least one second ROI with a first threshold and comparing the degree of similarity between the first feature vector and the second feature vector with a second threshold.

In operation S840, the IP camera system 100 determines a CU in which the target object is not recognized, based on the recognition result determined in operation S830. In an embodiment, the processing device 2000 may identify a CU for which the degree of overlap is less than or equal to the first threshold and the degree of similarity is less than or equal to the second threshold as a result of the comparison in operation S830, from among the at least one second CU identified in the reconstructed image, and determine the identified CU as a CU in which the target object is not correctly recognized.

In operation S850, the IP camera system 100 adjusts a compression ratio of the CU in which the target object is not recognized. In an embodiment, the processing device 2000 may change the compression ratio of the CU in which the target object is not recognized to a value lower than a value of a compression ratio of the reconstructed image in operation S810.

Figure 9:
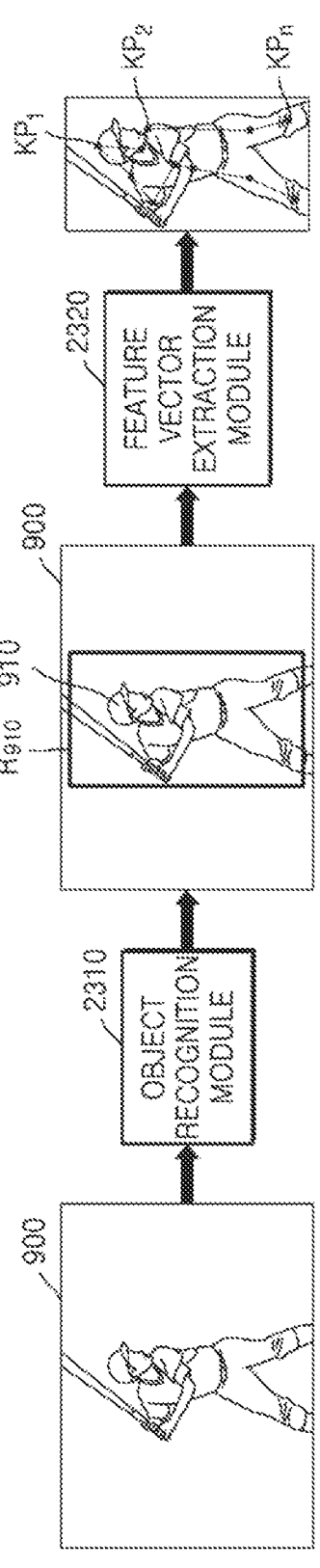
FIG. 9 is a diagram illustrating a method, performed by a device, of recognizing a target object from an image frame and extracting a feature vector from the recognized target object, according to an embodiment of the present disclosure.

FIG. 9 is a diagram illustrating a method, performed by a device, of recognizing a target object 910 in an image frame 900 and extracting a feature vector from the recognized target object 910, according to an embodiment of the present disclosure.

In the present disclosure, the 'device' may include the IP camera system 100 or the mobile device 300. Hereinafter, for convenience of description, a case in which the IP camera system 100, as an example of the device, performs operations of the method is described. The operations or functions described below may be performed equally by the mobile device 300.

Referring to FIG. 9, the processing device (2000 of FIG. 1A) of the IP camera system 100 may recognize the target object 910 in the image frame 900 by using an object recognition module 2310. The image frame 900 may be one of a plurality of frames constituting a video. A target object may be, for example, a person's face, hairstyle, clothing, or posture, but is not limited thereto. In the embodiment shown in FIG. 9, the target object 910 may be a person's posture.

For example, the object recognition module 2310 may detect the target object 910 in the image frame 900 by performing training using trained model parameters of a CNN model. However, a method, performed by the object recognition module 2310, of detecting the target object 910 is not limited to the above-described method. In an embodiment, the object recognition module 2310 may recognize the target object 910 in the image frame 900 by using an AI model including at least one of an RNN model, SVM, linear regression, logistic regression, Naive Bayes classification, random forest, decision tree, and a k-nearest neighbor algorithm.

In an embodiment, the processing device 2000 may identify a bounding box including the target object 910 detected in the image frame 900 by using the object recognition module 2310. The processing device 2000 may set the identified bounding box to be an ROI $R_{910}$.

The processing device 2000 may extract a feature vector from an image of the target object 910 included in the ROI $R_{910}$ by using the feature vector extraction module 2320. In an embodiment, the processing device 2000 may identify at least one key-point $KP_1$ to $KP_n$ from the image of the target object in the ROI $R_{910}$, extract coordinate values of each of the identified at least one key-point $KP_1$ to $KP_n$, and convert the extracted coordinate values into feature values according to a preset rule. The processing device 2000 may obtain a feature vector by using the feature values.

In the embodiment shown in FIG. 9, by using the feature vector extraction module 2320, the processing device 2000 may identify the first to n-th key-points $KP_1$ to $KP_n$ as representative values that may represent the person's posture, respectively convert the identified first to n-th key-points $KP_1$ to $KP_n$ into feature values, and generate a feature vector using the feature values.

In another embodiment, the feature vector extraction module 2320 may store a preset value according to each of a person's hairstyle (e.g., hair color, hair length, etc.), clothing color, and clothing style (e.g., T-shirt, jeans, dress, skirt, etc.). By using the feature vector extraction module 2320, the processing device 2000 may obtain a preset value related to a hairstyle or clothing from an image of a target object, and extract a feature vector using the obtained preset value.

A program executed by the IP camera system 100 described through the present disclosure may be implemented as a hardware component, a software component, and/or a combination of the hardware component and the software component. A program may be executed by any system capable of executing computer-readable instructions.

Software may include a computer program, a piece of code, an instruction, or a combination of one or more thereof, and may configure a processing device to operate as desired or instruct the processing device independently or collectively.

The software may be implemented as a computer program including instructions stored in computer-readable storage media. Examples of the computer-readable recording media include magnetic storage media (e.g., ROM, RAM, floppy disks, hard disks, etc.), optical recording media (e.g., CD-ROM, digital versatile disks (DVDs), etc.), etc. The computer-readable recording media may be distributed over computer systems connected through a network so that computer-readable code may be stored and executed in a distributed manner. The media may be read by a computer, stored in a memory, and executed by a processor.

A computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium.

Furthermore, programs according to embodiments disclosed in the present specification may be included in the form of a computer program product when provided. The computer program product may be traded, as a product, between a seller and a buyer.

The computer program product may include a software program and a computer-readable storage medium having stored thereon the software program. For example, the computer program product may include a product (e.g., a downloadable application) in the form of a software program electronically distributed by a manufacturer of a device or through an electronic market (e.g., Google Play Store™ and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and the device, the computer program product may include a storage medium of the server or a storage medium of the device. Alternatively, in a case where there is a third device (e.g., a smartphone) communicatively connected to the server or the device, the computer program product may include a storage medium of the third device. Alternatively, the computer program product may include a software program itself that is transmitted from the server to the device or the third device or that is transmitted from the third device to the device.

In this case, one of the server, the device, and the third device may execute the computer program product to perform methods according to embodiments of the disclosure. Alternatively, two or more of the server, the device, and the third device may execute the computer program product to perform the methods according to the embodiments of the disclosure in a distributed manner.

For example, the server may execute the computer program product stored therein to control the device communicatively connected to the server to perform the methods according to the embodiments of the disclosure.

In another example, the third device may execute the computer program product to control the device communicatively connected to the third device to perform the methods according to the embodiments of the disclosure.

In a case where the third device executes the computer program product, the third device may download the computer program product from the server and execute the downloaded computer program product. Alternatively, the third device may execute the computer program product that is pre-loaded therein to perform the methods according to the embodiments of the disclosure.

While the embodiments have been described with reference to the figures, it will be understood by those of ordinary skill in the art that various modifications and changes in form and details may be made from the above descriptions. For example, adequate effects may be achieved even when the above techniques are performed in a different order than that described above, and/or the aforementioned components such as computer systems or modules are coupled or combined in different forms and modes than those described above or are replaced or supplemented by other components or their equivalents.

What is claimed is:

1. A method performed by a processing device, the method comprising:
  obtaining a raw image from at least one imaging sensor;
  obtaining a reconstructed image from the raw image by operations of compressing the raw image at a preset compression ratio, encoding the compressed raw image, and decoding the encoded compressed raw image;
  recognizing, in the raw image, a target object and a first region of interest (ROI) including the target object, and extracting a first feature vector from the target object recognized in the raw image;
  recognizing, in the reconstructed image, the target object and a second ROI including the target object, and extracting a second feature vector from the target object recognized in the reconstructed image;
  calculating a degree of overlap between the first ROI and the second ROI based on coordinate value information of each of a first bounding box of the first ROI and a second bounding box of the second ROI;
  determining, based on the calculated degree of overlap between the first ROI and the second ROI and a degree of similarity between the first feature vector and the second feature vector, whether the target object is recognized in the reconstructed image; and
  adjusting the preset compression ratio according to whether the target object is recognized.

2. The method of claim 1, wherein the determining of whether the target object is recognized comprises:
  calculating the degree of similarity between the first feature vector and the second feature vector;
  comparing the calculated degree of overlap with a preset first threshold and comparing the calculated degree of similarity with a preset second threshold; and
  determining, based on results of the comparisons, whether the target object is recognized in the reconstructed image.

3. The method of claim 2, wherein the adjusting of the preset compression ratio based on the comparing between the calculated degree of overlap with the first threshold or the comparing between the calculated degree of similarity with the second threshold threshold, comprises lowering a value of the preset compression ratio based on (i) the degree of overlap that is less than or equal to the first threshold or (ii) the degree of similarity that is less than or equal to the second threshold.

4. The method of claim 3, further comprising obtaining another reconstructed image of the raw image by compressing the raw image at an adjusted preset compression ratio, encoding the compressed raw image, and decoding the encoded image, wherein the adjusted preset compression ratio has the value that is lowered based on (i) the degree of overlap that is less than or equal to the first threshold or (ii) the degree of similarity that is less than or equal to the second threshold.

5. The method of claim 2, wherein the adjusting of the preset compression ratio comprises determining the preset compression ratio to obtain the reconstructed image as a final compression ratio based on the calculated degree of overlap exceeds the first threshold or the calculated degree of similarity exceeds the second threshold.

6. The method of claim 2, wherein the calculating of the degree of overlap comprises:

obtaining first position coordinate values of the first ROI that is a region where the target object is recognized from the raw image;

obtaining second position coordinate values of the second ROI that is a region where the target object is recognized from the reconstructed image; and calculating the degree of overlap, which indicates a degree to which the first ROI and the second ROI overlap, by using the first position coordinate values and the second position coordinate values.

7. The method of claim 1, wherein the reconstructed image is obtained by compressing, encoding, and decoding the raw image by using at least one image compression standard, and wherein the preset compression ratio is determined by a quantization parameter (QP) in the at least one image compression standard.

8. A processing device comprising:

an imaging sensor configured to obtain a raw image by capturing an image of an object;

an encoder comprising:

an encoding module configured to generate encoded image data by compressing the raw image at a preset compression ratio and encoding the compressed raw image into image data, and a decoding module configured to generate a reconstructed image from the raw image by decoding the encoded compressed raw image data;

a network interface configured to receive the raw image and the reconstructed image;

a memory storing a program including one or more instructions; and at least one processor configured to execute the one or more instructions of the program stored in the memory to:

recognize, in the raw image, a target object and a first region of interest (ROI) including the target object, and extract a first feature vector from the target object recognized in the raw image, recognize, in the reconstructed image, the target object and a second ROI including the target object, and extract a second feature vector from the target object recognized in the reconstructed image, calculate a degree of overlap between the first ROI and the second ROI based on coordinate value information of each of a first bounding box of the first ROI and a second bounding box of the second ROI, determine, based on the calculated degree of overlap between the first ROI and the second ROI and a degree of similarity between the first feature vector and the second feature vector, whether the target object is recognized in the reconstructed image, and adjust the preset compression ratio according to whether the target object is recognized.

9. The processing device of claim 8, wherein the at least one processor is further configured to:

calculate the degree of similarity between the first feature vector and the second feature vector, compare the calculated degree of overlap with a preset first threshold and compare the calculated degree of similarity with a preset second threshold, and determine, based on results of the comparisons, whether the target object is recognized in the reconstructed image.

10. The processing device of claim 9, wherein the at least one processor is further configured to lower a value of the preset compression ratio based on (i) the degree of overlap that is less than or equal to the first threshold or (ii) the degree of similarity that is less than or equal to the second threshold.

11. The processing device of claim 10, wherein the at least one processor is further configured to obtain another reconstructed image from the raw image by compressing the raw image at an adjusted preset compression ratio, encoding the compressed raw image, and decoding the encoded compressed raw image, and wherein the adjusted preset compression ratio has the value that is lowered based on (i) the degree of overlap that is less than or equal to the first threshold or (ii) the degree of similarity that is less than or equal to the second threshold.

12. The processing device of claim 9, wherein the at least one processor is further configured to determine to obtain the reconstructed image as a final compression ratio based on the calculated degree of overlap exceeds the first threshold or the calculated degree of similarity exceeds the second threshold.

13. The processing device of claim 8, wherein the at least one processor is further configured to:

obtain first position coordinate values of the first ROI that is a region where the target object is recognized from the raw image, obtain second position coordinate values of the second ROI that is a region where the target object is recognized from the reconstructed image, and calculate the degree of overlap, which indicates a degree to which the first ROI and the second ROI overlap, by using the first position coordinate values and the second position coordinate values.

14. The processing device of claim 8, wherein the reconstructed image is obtained by compressing, encoding, and decoding the raw image by using at least one image compression standard, and wherein the preset compression ratio is determined by a quantization parameter (QP) in the at least one image compression standard.

15. A computer program product comprising a computer-readable storage medium, wherein the computer-readable storage medium includes instructions performed by a processing device, the instructions for:

obtaining a raw image from at least one imaging sensor;

obtaining a reconstructed image from the raw image by operations of compressing the raw image at a preset compression ratio, encoding the compressed raw image, and decoding the encoded compressed raw image;

recognizing, in the raw image, a target object and a first region of interest (ROI) including the target object, and extracting a first feature vector from the target object recognized in the raw image;

recognizing, in the reconstructed image, the target object and a second ROI including the target object, and extracting a second feature vector from the target object recognized in the reconstructed image;

calculating a degree of overlap between the first ROI and the second ROI based on coordinate value information of each of a first bounding box of the first ROI and a second bounding box of the second ROI;

determining, based on the calculated degree of overlap between the first ROI and the second ROI and a degree of similarity between the first feature vector and the second feature vector, whether the target object is recognized in the reconstructed image; and adjusting the preset compression ratio according to whether the target object is recognized.

16. The method of claim 6, wherein the at least one image compression standard is at least one of H.264/advanced video coding (AVC) or high efficiency video coding (HEVC) (H.265).

17. The processing device of claim 13, wherein the at least one image compression standard is at least one of H.264/advanced video coding (AVC) or high efficiency video coding (HEVC) (H.265).

* * * * *